(12) United States Patent
Zheng et al.

(10) Patent No.: US 12,354,590 B2
(45) Date of Patent: Jul. 8, 2025

(54) AUDIO PROCESSING METHOD AND APPARATUS BASED ON ARTIFICIAL INTELLIGENCE, DEVICE, STORAGE MEDIUM, AND COMPUTER PROGRAM PRODUCT

(71) Applicant: Tencent Technology (Shenzhen) Company Limited, Shenzhen (CN)

(72) Inventors: Yibin Zheng, Shenzhen (CN); Xinhui Li, Shenzhen (CN); Wenchao Su, Shenzhen (CN); Li Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 208 days.

(21) Appl. No.: 18/123,695

(22) Filed: Mar. 20, 2023

(65) Prior Publication Data

US 2023/0230571 A1    Jul. 20, 2023

Related U.S. Application Data

(63) Continuation of application No. PCT/CN2022/090951, filed on May 5, 2022.

(30) Foreign Application Priority Data

Jun. 3, 2021 (CN) .......................... 202110620109.5

(51) Int. Cl.
*G10L 13/02* (2013.01)
(52) U.S. Cl.
CPC ..................................... *G10L 13/02* (2013.01)
(58) Field of Classification Search
None
See application file for complete search history.

(56) References Cited

U.S. PATENT DOCUMENTS

| 6,098,041 A * | 8/2000 | Matsumoto ............ H04M 11/00 |
| | | 704/260 |
| 2002/0016709 A1* | 2/2002 | Holzapfel ............... G10L 13/06 |
| | | 704/245 |

(Continued)

FOREIGN PATENT DOCUMENTS

| CN | 111326136 A | 6/2020 |
| CN | 112349273 A | 2/2021 |

(Continued)

OTHER PUBLICATIONS

Tencent Technology, ISR, PCT/CN2022/090951, Aug. 3, 2022, 2 pgs.

(Continued)

*Primary Examiner* — Neeraj Sharma
(74) *Attorney, Agent, or Firm* — Morgan, Lewis & Bockius LLP

(57) ABSTRACT

Disclosed are an audio processing method performed by an electronic device, a non-transitory computer-readable storage medium, and a computer program product. The method includes: sampling multiple fragments of audio data of a target object to obtain reference audio data of the target object; performing audio encoding on the reference audio data of the target object to obtain a reference embedding vector of the reference audio data; performing tone-based attention processing on the reference embedding vector of the reference audio data to obtain a tone embedding vector of the target object, wherein the tone embedding vector is independent from content of the audio data; and generating audio data of a target text that conforms to a tone of the target object according to the tone embedding vector of the target object.

18 Claims, 9 Drawing Sheets

(56) References Cited

U.S. PATENT DOCUMENTS

| | | | | |
|---|---|---|---|---|
| 2017/0068665 | A1* | 3/2017 | Tamura | G06F 40/44 |
| 2020/0372897 | A1* | 11/2020 | Battenberg | G10L 13/10 |
| 2020/0380949 | A1* | 12/2020 | Wu | G06N 3/08 |
| 2021/0035551 | A1* | 2/2021 | Stanton | G10L 13/04 |
| 2021/0090551 | A1* | 3/2021 | Jang | G10L 13/08 |
| 2021/0142783 | A1* | 5/2021 | Kim | G10L 13/033 |
| 2021/0342634 | A1* | 11/2021 | Chen | G06F 16/137 |
| 2022/0122582 | A1* | 4/2022 | Elias | G06N 3/045 |
| 2022/0405580 | A1* | 12/2022 | Zheng | G06F 18/24147 |
| 2023/0081659 | A1* | 3/2023 | Pan | G10L 13/033 704/259 |

FOREIGN PATENT DOCUMENTS

| | | |
|---|---|---|
| CN | 112687258 A | 4/2021 |
| CN | 112786009 A | 5/2021 |
| CN | 112802448 A | 5/2021 |
| CN | 113822017 A | 12/2021 |

OTHER PUBLICATIONS

Tencent Technology, WO, PCT/CN2022/090951, Aug. 3, 2022, 5 pgs.
Tencent Technology, IPRP, PCT/CN2022/090951, Nov. 21, 2023, 6 pgs.

\* cited by examiner

AUDIO PROCESSING METHOD AND APPARATUS BASED ON ARTIFICIAL INTELLIGENCE, DEVICE, STORAGE MEDIUM, AND COMPUTER PROGRAM PRODUCT

CROSS-REFERENCE TO RELATED APPLICATIONS

This application is a continuation application of PCT Patent Application No. PCT/CN2022/090951, entitled "AUDIO PROCESSING METHOD AND APPARATUS BASED ON ARTIFICIAL INTELLIGENCE, DEVICE, STORAGE MEDIUM, AND COMPUTER PROGRAM PRODUCT" filed on May 5, 2022, which claims priority to Chinese Patent Application No. 202110620109.5, entitled AUDIO PROCESSING METHOD AND APPARATUS BASED ON ARTIFICIAL INTELLIGENCE, DEVICE, STORAGE MEDIUM, AND COMPUTER PROGRAM PRODUCT" filed on Jun. 3, 2021, all of which is incorporated herein by reference in its entirety.

FIELD OF THE TECHNOLOGY

This application relates to an artificial intelligence technology, and in particular, to an audio processing method and apparatus based on artificial intelligence, an electronic device, a computer-readable storage medium, and a computer program product.

BACKGROUND OF THE DISCLOSURE

Artificial intelligence (AI) is a comprehensive technology of computer science. By studying design principles and implementation methods of various intelligent machines, the artificial intelligence enables a machine to have functions of perception, inference, and decision-making. The artificial intelligence technology is a comprehensive discipline, involving a wide range of fields, such as natural language processing technology and machine learning/deep learning. With development, the artificial intelligence technology is to be used in more fields and develop an increasingly important value.

In related technologies, audio synthesis methods are relatively rough. Generally, features are directly extracted from audio data of a target object, and are synthesized based on an extracted embedding vector of the target object to obtain synthesized audio data. This synthesis method, which directly extracts the embedding vector of the target object from the audio data, inevitably introduces content-related information (for example, a rhythm and a style) in the audio data. As a result, when content of a to-be-synthesized target text is inconsistent with content of the audio data, an audio synthesis effect is unstable, and precise synthesis of an audio cannot be implemented, thereby wasting large amounts of computing resources and affecting user experience of normal audio synthesis.

SUMMARY

Embodiments of this application provide an audio processing method and apparatus based on artificial intelligence, an electronic device, a computer-readable storage medium, and a computer program product, to improve accuracy of audio synthesis.

Technical solutions of the embodiments of this application are implemented as follows:

An embodiment of this application provides an audio processing method based on artificial intelligence, including:
sampling multiple fragments of audio data of a target object to obtain reference audio data of the target object;
performing audio encoding on the reference audio data of the target object to obtain a reference embedding vector of the reference audio data;
performing tone-based attention processing on the reference embedding vector of the reference audio data to obtain a tone embedding vector of the target object, wherein the tone embedding vector is independent from content of the audio data;
generating audio data of a target text that conforms to a tone of the target object according to the tone embedding vector of the target object.

An embodiment of this application provides an electronic device for audio processing, the electronic device including:
a memory, configured to store executable instructions; and
a processor, configured to, when executing the executable instructions stored in the memory, cause the electronic device to perform the aforementioned audio processing method according to the embodiments of this application.

An embodiment of this application provides a non-transitory computer-readable storage medium, storing executable instructions that, when executed by a processor of an electronic device, cause the electronic device to perform the aforementioned audio processing method according to the embodiments of this application.

By attention processing on the reference audio data, obtained by sampling multiple fragments of audio data, of the target object, the tone embedding vector is represented in a diversified manner, to improve robustness of extraction of the tone embedding vector. Compared with a related technology in which an embedding vector of a target object is directly extracted from specific audio data for audio synthesis, the audio synthesis combining the diversified tone embedding vector of the target object and the content embedding vector of the target text in the embodiments of this application can avoid introducing content-related information in the audio data, thereby improving stability of the audio synthesis, and implementing accurate personalized audio generation based on the accurate tone embedding vector to save related computing resources.

DESCRIPTION OF EMBODIMENTS

Figure 1:
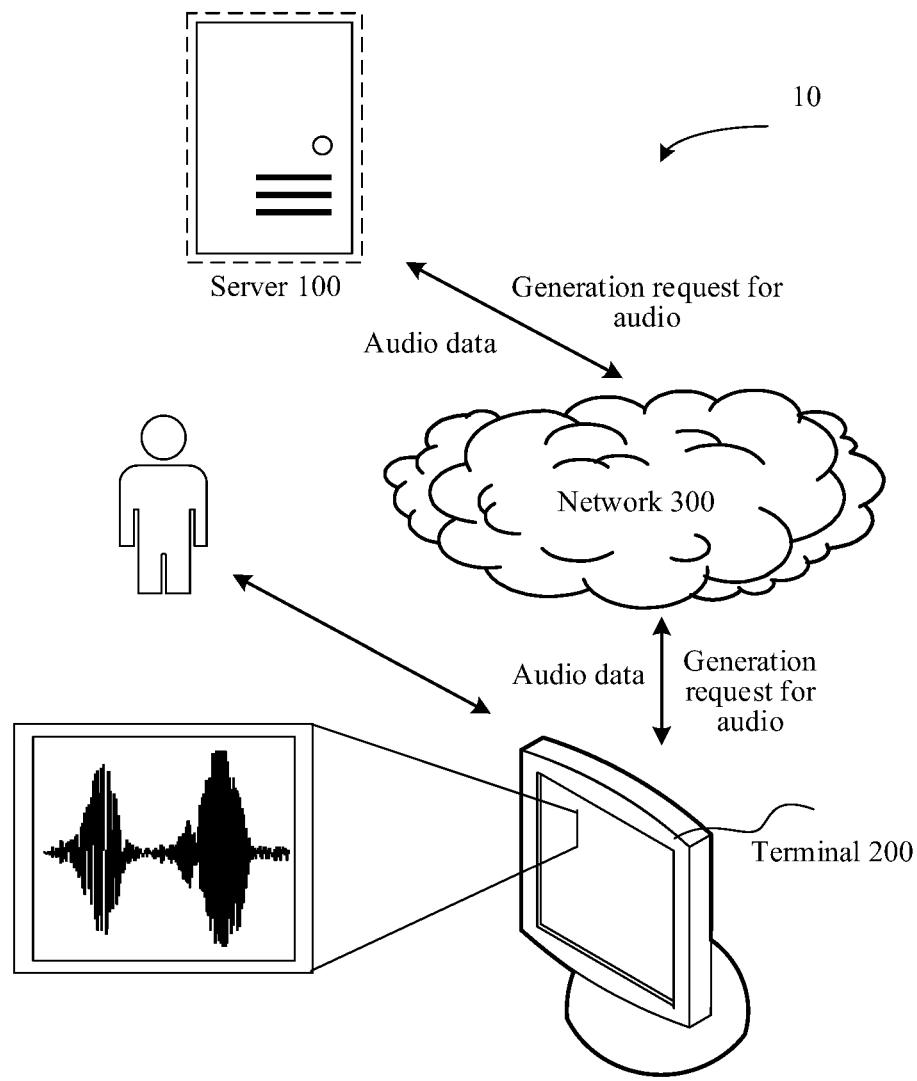
FIG. 1 is a schematic diagram of an application scenario of an audio processing system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the terms "first" and "second" involved are merely intended to distinguish similar objects, and do not denote a particular order of the objects. It can be understood that the terms "first" and "second" may be interchanged either in a particular order or in a sequential order as permitted, to enable embodiments of this application described herein to be practiced otherwise than as specifically illustrated or described herein.

Unless otherwise defined, meanings of all technical and scientific terms used in this specification are the same as those usually understood by a person skilled in the art to which this application belongs. The terms used herein are only used to describe the embodiments of this application, and are not intended to limit this application.

Before the embodiments of this application are further described in detail, a description is made on nouns and terms in the embodiments of this application, and the nouns and terms in the embodiments of this application are applicable to the following explanations.

1) Convolutional neural networks (CNN): a class of feedforward neural networks (FNN) involving convolution computing and having a deep structure, and one of representative algorithms of deep learning. Convolutional neural networks have an ability of representation learning, and can implement shift-invariant classification on input images according to hierarchical structures of the convolutional neural networks.

2) Recurrent neural network (RNN): a class of recursive neural networks with sequence data as input, recursion in an evolution direction of a sequence, and all nodes (recurrent units) connected in a chain. The recurrent neural network has functions of memory, parameter sharing, and Turing completeness, and therefore, has some advantages in learning nonlinear characteristics of a sequence.

3) Phonemes: minimum basic units in a speech. Phonemes are the basis on which humans can distinguish one word from another. The phonemes constitute syllables, which in turn constitute different words and phrases.

4) Tone: Different audio representations always have distinctive characteristics in terms of waveform, and different object vibrations have different characteristics. Tones of audios produced by different sounding bodies are also different due to different materials and structures of the sounding bodies. For example, a piano, a violin, and a person produce different sounds, and each person produces different audios, that is, the tones may be understood as characteristics of the audios.

5) Target object: a real object in a real world or a virtual object in a virtual scenario, such as a real user, a virtual character, a virtual animal, or a cartoon character.

In recent years, with large-scale improvement of computing power, deep learning technology has been widely studied and applied, which further promotes the development of speech synthesis technology. End-to-end speech synthesis acoustic modeling methods begin to emerge. Such methods predict a corresponding acoustic feature sequence directly from an input character or phoneme sequence, and have been widely used in both academic and industrial circles. However, training such a commercial speech synthesis system generally requires tens of hours of data, and such requirement is unlikely in many application scenarios. Therefore, requirements for a speech synthesis customization technology based on a small volume of data are increasingly urgent.

Speech synthesis customization acoustic modeling methods may be classified into the following two classes: In a first method, a multi-speaker model (also referred to as an average model) is first pre-trained on a corpus of multiple speakers (objects), and then adaptive training is performed by using a small volume of data of the speakers on the basis of the average model; and In a second method, a speaker embedding vector is predicted directly from an audio of a target speaker and then input directly into the average model without any fine-tuning training of the model.

However, related technologies have the following problems: One-hot encoding is used to represent speakers in speaker embedding space modeling, and the represented information can only distinguish different speakers, but does not contain information related to speakers' tones. Another method of extracting embedding space representation directly from an audio, which extracts speaker embedding information directly from the audio matched with a text, inevitably introduces information related to audio content (for example, rhythm and style), resulting in an unstable synthesis effect when content of a to-be-synthesized text is inconsistent with content of a reference audio.

In order to solve the foregoing problems, embodiments of this application provide an audio processing method and apparatus based on artificial intelligence, an electronic device, a computer-readable storage medium, and a computer program product, to improve stability of audio synthesis.

The audio processing method based on artificial intelligence according to the embodiments of this application may be implemented by a terminal/server alone, and may also be implemented by a terminal and a server cooperatively. For example, the terminal undertakes alone the audio processing method based on artificial intelligence as described below. Alternatively, the terminal sends a generation request (including a target object and a target text) for an audio to the server, and the server executes, according to the received generation request for an audio, the audio processing method based on artificial intelligence, and in response to the generation request for an audio, synthesizes a tone embedding vector of the target object and a content embedding vector of the target text, to obtain audio data which conform to a tone of the target object and correspond to the target text, thereby implementing intelligent and accurate generation of the audio.

The electronic device for audio processing according to the embodiments of this application may be various types of terminal devices or servers. The server may be an independent physical server, a server cluster or distributed system composed of multiple physical servers, or a cloud server providing a cloud computing service. The terminal may be, but is not limited to, a smart phone, a tablet computer, a notebook computer, a desktop computer, a smart speaker, a smart watch, or the like. The terminal and the server may be connected directly or indirectly in a wired or wireless communication manner, and this application is not limited thereto.

For example, the server may be a server cluster deployed at a cloud, where an artificial intelligence cloud service (AIaaS, AI as a Service) is opened to users, and an AIaaS platform splits several types of common AI services and provides independent or packaged services at the cloud. This service mode is similar to an AI theme mall, and all users may access, by means of an application programming interface, one or more artificial intelligence services provided by the AIaaS platform.

For example, one of the artificial intelligence cloud services may be an audio processing service, namely, the server on the cloud packages an audio processing program provided by the embodiments of this application. A user invokes the audio processing service among the cloud services via a terminal (running a client, for example, an audio client or a vehicle client), so that the server deployed at the cloud invokes the packaged audio processing program for sampling and attention processing on audio data of a target object to obtain a tone embedding vector of the target object, and synthesizes the tone embedding vector of the target object and a content embedding vector of a target text to obtain audio data which conform to a tone of the target object and correspond to the target text, thereby implementing intelligent and accurate generation of an audio.

As an application example, for an audio client, the target object may be a broadcaster of a broadcast platform, needing to regularly broadcast notes, knowledge of life, and the like to residents of a community. For example, the broadcaster inputs a fragment of target text at the audio client, where the text needs to be converted into an audio to be broadcast to the residents of the community; and a tone embedding vector of the broadcaster and a content embedding vector of the target text are synthesized to obtain audio data which conform to a tone of the broadcaster and correspond to the target text, so as to broadcast the generated audio to the residents.

As another application example, for a vehicle client, when a user is driving, it is inconvenient to learn information in a form of a text, but the information can be learned by reading an audio, to avoid missing important information. For example, when the user is driving, a conference host sends a fragment of text of an important conference to a participant user, and the participant user is required to read and process the text in time; after receiving the text, the vehicle client needs to convert the text into an audio, so as to play the audio to the participant user; and the vehicle client synthesizes a tone embedding vector of the conference host and a content embedding vector of the text, to obtain audio data which conform to a tone of the conference host and corresponds to the text, so as to play the generated audio to the participant user, so that the participant user can read the audio of the conference host in time.

Refer to FIG. 1. FIG. 1 is a schematic diagram of an application scenario of an audio processing system 10 according to an embodiment of this application. A terminal 200 is connected to a server 100 via a network 300, where the network 300 may be a wide area network or a local area network, or a combination of both.

The terminal 200 (running a client, for example, an audio client or a vehicle client) may be configured to obtain a generation request for an audio. For example, when a user inputs a target object and a target text through the terminal 200, the terminal 200 automatically obtains the target text and multiple fragments of audio data of the target object, and automatically generates a generation request for an audio.

In some embodiments, an audio processing plug-in may be embedding in the client run in the terminal, to implement an audio processing method based on artificial intelligence locally at the client. For example, after obtaining the generation request (including a target object and a target text) for the audio, the terminal 200 invokes the audio processing plug-in to implement the audio processing method based on artificial intelligence, that is, performs sampling and attention processing on audio data of the target object to obtain a tone embedding vector of the target object, and synthesizes the tone embedding vector of the target object and a content embedding vector of the target text, to obtain audio data which conform to a tone of the target object and correspond to the target text, so as to implement intelligent and accurate generation of the audio. For example, with regard to a recording application, if a user cannot perform high-quality personalized sound customization in a non-studio scenario, a fragment of to-be-recorded text is input in a recording client, where the text needs to be converted into a personalized audio; and a personalized tone embedding vector and a content embedding vector of the text are synthesized to generate, based on the accurate tone embedding vector, an accurate personalized audio, so as to implement personalized sound customization in the non-studio scenario.

In some embodiments, after obtaining a generation request for an audio, the terminal 200 invokes an audio processing interface (which may be provided in a form of a cloud service, namely, an audio processing service) of the server 100; and the server 100 performs sampling and attention processing on audio data of a target object to obtain a tone embedding vector of the target object, synthesizes the tone embedding vector of the target object and a content embedding vector of a target text to obtain audio data which conform to a tone of the target object and correspond to the target text, and sends the audio data to the terminal 200. For example, with regard to a recording application, if a user cannot perform high-quality personalized sound customization in a non-studio scenario, a fragment of to-be-recorded text is input in the terminal 200, a generation request for an audio is automatically generated and sent to the server 100, and the server 100 synthesizes a personalized tone embedding vector and a text content embedding vector to generate, based on the accurate tone embedding vector, an accurate personalized audio, and sends the generated personalized audio to the terminal 200, so as to implement personalized sound customization in the non-studio scenario in response to the generation request for an audio.

Figure 2:
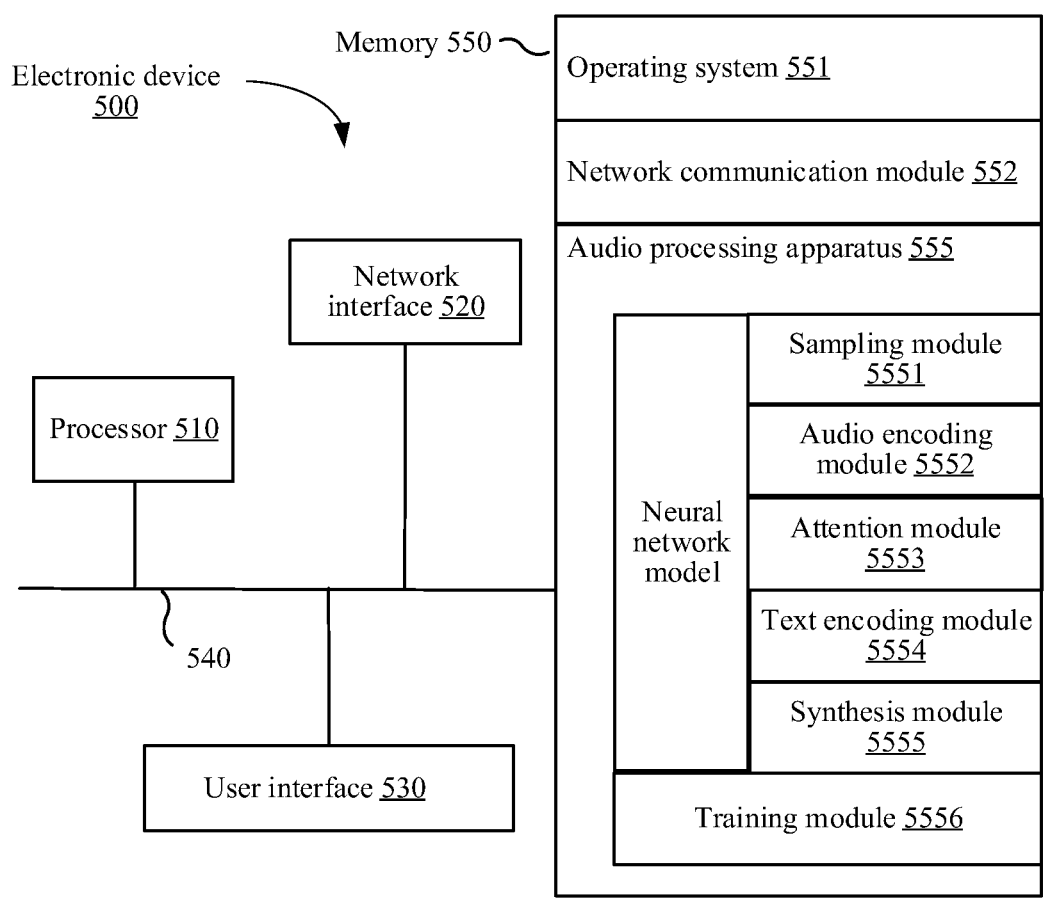
FIG. 2 is a schematic diagram of a structure of an electronic device for audio processing according to an embodiment of this application.

A structure of an electronic device for audio processing according to an embodiment of this application is described below. Refer to FIG. 2. FIG. 2 is a schematic diagram of a structure of an electronic device 500 for audio processing according to an embodiment of this application. For example, the electronic device 500 is a server, and the electronic device 500 for audio processing, shown in FIG. 2, includes: at least one processor 510, a memory 550, at least one network interface 520, and a user interface 530. The components in the electronic device 500 are coupled together through a bus system 540. It may be understood that, the bus system 540 is configured to implement connection and communication between the components. In addition to a data bus, the bus system 540 further includes a power bus, a control bus, and a status signal bus. However, for clarity of description, various buses are marked as the bus system 540 in FIG. 2.

The processor 510 may be an integrated circuit chip having signal processing capabilities, for example, a general purpose processor, a digital signal processor (DSP), or another programmable logic device, discrete gate, or transistor logic, or a discrete hardware component, where the general purpose processor may be a microprocessor, any conventional processor, or the like.

The memory 550 includes either a volatile memory or a non-volatile memory, or may include both a volatile memory and a non-volatile memory. The non-volatile memory may be a read only memory (ROM), and the volatile memory may be a random access memory (RAM). The memory 550 described in this embodiment of this embodiment is intended to include any suitable type of memory. The memory 550 optionally includes one or more storage devices physically located away from the processor 510.

In some embodiments, the memory 550 is capable of storing data to support various operations, and examples of the data include programs, modules, and data structures, or subsets or superset thereof, as exemplified below:

an operating system 551, including a system program for processing various basic system services and performing hardware-related tasks, such as a framework layer, a core library layer, and a driver layer, for implementing various basic services and processing hardware-based tasks; and a network communication module 552, configured to arrive at other computing devices via one or more (wired or wireless) network interfaces 520, exemplary network interfaces 520 including: Bluetooth, wireless fidelity (WiFi), a universal serial bus (USB), and the like.

In some embodiments, the audio processing apparatus provided by the embodiments of this application may be implemented in software, and may be, for example, the audio processing plug-in in the terminal as described above, or the audio processing service in the server as described above. Of course, without limitation, the audio processing apparatus provided by the embodiments of this application may be provided as various software embodiments, including various forms of an application, software, software modules, scripts, or code.

FIG. 2 shows an audio processing apparatus 555 stored in the memory 550. The audio processing apparatus 555 may be software in forms of a program and a plug-in, for example, an audio processing plug-in, and includes a series of modules, including a sampling module 5551, an audio encoding module 5552, an attention module 5553, a text encoding module 5554, a synthesis module 5555, and a training module 5556. The sampling module 5551, the audio encoding module 5552, the attention module 5553, the text encoding module 5554, and the synthesis module 5555 are configured to implement an audio processing function provided by the embodiments of this application, and the training module 5556 is configured to train a neural network model, where the audio processing method is implemented by invoking the neural network model.

Figure 3:
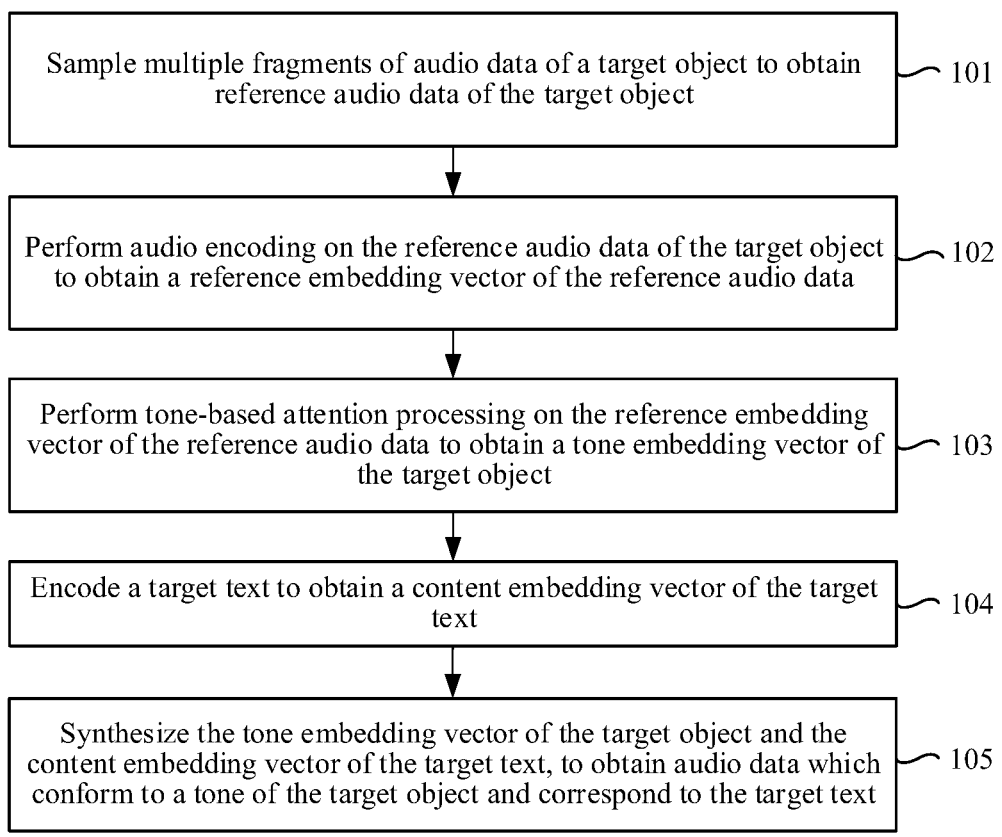
FIG. 3 to FIG. 5 are schematic flowcharts of an audio processing method based on artificial intelligence according to an embodiment of this application.

As described above, the audio processing method based on artificial intelligence according to the embodiments of this application may be implemented by various types of electronic devices. Refer to FIG. 3. FIG. 3 is a schematic flowchart of an audio processing method performed by an electronic device 500 depicted in FIG. 2 based on artificial intelligence according to an embodiment of this application. The audio processing method is described with reference to steps shown in FIG. 3.

Step 101: Sample multiple fragments of audio data of a target object to obtain reference audio data of the target object.

As an example of obtaining a target object, a user inputs a target object and a target text through a terminal, then the terminal automatically generates a generation request (including the target text and an identifier of the target object) for an audio and sends the generation request for an audio to a server, and the server parses the generation request for an audio to obtain the identifier of the target object, obtains, based on the identifier of the target object, multiple fragments of audio data (namely, audio fragments) of the target object from a database, randomly samples the multiple fragments of audio data, and uses the audio data obtained by sampling as reference audio data of the target object (the reference audio data are a segment of audio data with a variable length obtained by sampling from the multiple fragments of audio data with different lengths, and are used for assisting in representing the multiple fragments of audio data of the target object). The random sampling improves diversity of the reference audio data of the target object, and avoids limitation to a specific audio data, thereby ensuring that a reference embedding vector subsequently obtained is independent of content of the audio data, and avoiding a problem of an unstable audio synthesis effect caused by inconsistent content of the to-be-synthesized target text and the audio data.

For example, for any target object (namely, speaker m), a segment of audio data is randomly sampled from a corpus (including multiple fragments of audio data with different lengths) corresponding to the target object as reference audio data $y^r = y^{Random(N)}$ where Random(N) represents any positive integer in [1, N], and N represents a maximum number of texts corresponding to the audio data of the target object, for example, a maximum length of a text sequence corresponding to the audio data in the corpus is defined as 256, namely, N is 256.

Step 102: Perform audio encoding on the reference audio data of the target object to obtain a reference embedding vector of the reference audio data.

For example, the reference audio data of the target object are used as input of an encoder, and audio encoding is performed on the reference audio data (a lengthened audio sequence) obtained by random sampling via the encoder to obtain a reference embedding vector of the reference audio data (namely, an embedding vector of the reference audio data), so as to perform attention processing subsequently based on the reference embedding vector to construct a more robust and accurate object embedding space, thereby improving naturalness (in a subjective mean opinion score (MOS) of similarities, naturalness is evaluated from a continuity, a rhythm sense, and the like of an audio, namely, the better the continuity and the rhythm sense are, the better the naturalness is) of a generated audio subsequently and fitness of a tone of the generated audio and a tone of the target object.

The audio encoding is implemented by compressing an audio through the encoder in a neural network, so as to compress and convert the reference audio data (analog signal) into the reference embedding vector (digital signal). This embodiment of this application does not limit a model structure of the encoder, for example, the encoder may be a convolutional neural network, a recurrent neural network, or a deep neural network.

In some embodiments, the performing audio encoding on the reference audio data of the target object to obtain a reference embedding vector of the reference audio data includes: performing convolution processing on the reference audio data of the target object to obtain a convolution embedding vector of the reference audio data; and encoding the convolution embedding vector of the reference audio data to obtain the reference embedding vector of the reference audio data.

Figure 6:
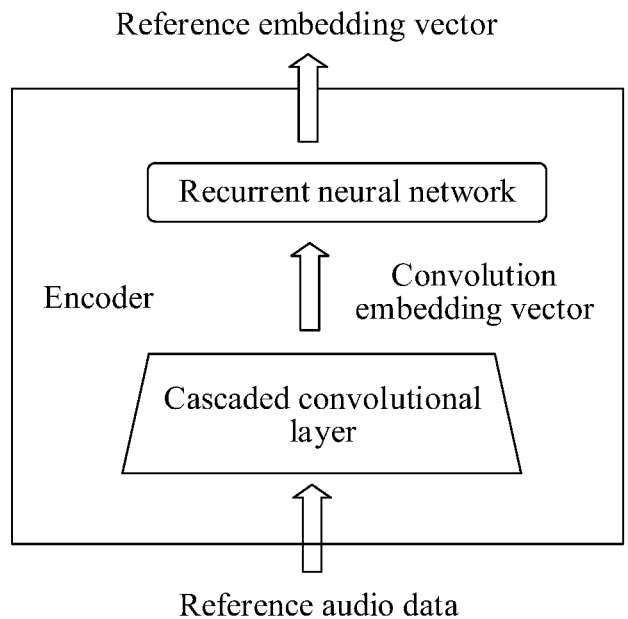
FIG. 6 is a schematic diagram of a structure of an encoder according to an embodiment of this application.

As shown in FIG. 6, convolution processing is performed on the reference audio data of the target object by a cascaded convolutional layer in an encoder to obtain a convolution embedding vector of the reference audio data, and then the convolution embedding vector of the reference audio data is encoded by a recurrent neural network in the encoder to obtain a reference embedding vector of the reference audio data. Therefore, the embedding vector of the reference audio data can be extracted by convolution processing and encoding more accurately than single convolution processing, and audio synthesis is performed subsequently based on the accurate embedding vector, thereby improving accuracy of the audio synthesis.

Vector space conversion is performed on the convolution embedding vector of the reference audio data to implement encoding of the convolution embedding vector, that is, the convolution embedding vector (a K-dimensional vector of a vector space, where K is a positive integer greater than 1) is converted into a reference embedding vector (an H-dimensional vector of another vector space, where H is a positive integer greater than 1).

In some embodiments, the audio encoding is implemented by an encoder, the encoder including multiple cascaded convolutional layers; and the performing convolution processing on the reference audio data of the target object to obtain a convolution embedding vector of the reference audio data includes: performing, by a first convolutional layer among the multiple cascaded convolutional layers, convolution processing on the reference audio data of the target object; and outputting a convolution result of the first convolutional layer to a subsequent cascaded convolutional layer, continuing, by the subsequent cascaded convolutional layer, to perform the convolution processing and output a convolution result until a last convolutional layer outputs a convolution result, and using the convolution result output by the last convolutional layer as the convolution embedding vector of the reference audio data.

Figure 7:
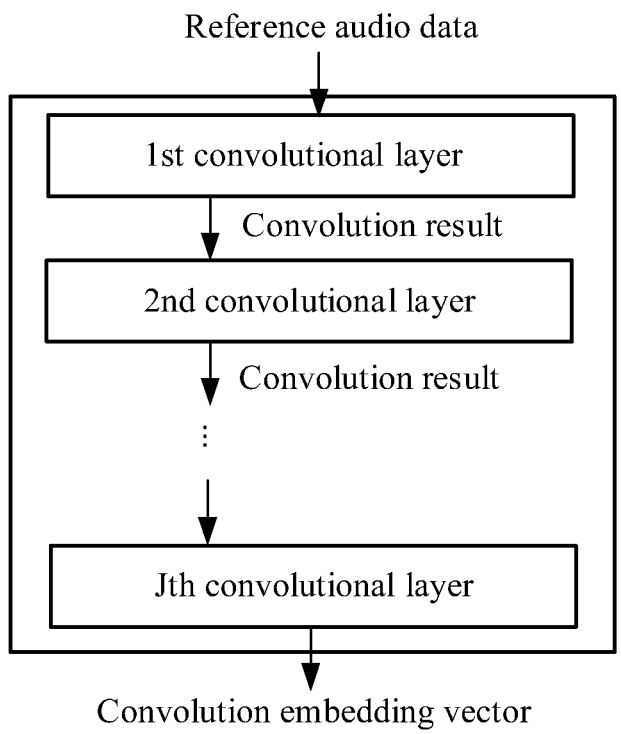
FIG. 7 is a schematic diagram of a structure of cascaded convolutional layers according to an embodiment of this application.

As shown in FIG. 7, an encoder includes J cascaded convolutional layers, among which a first convolutional layer performs convolution encoding on the reference audio data and outputs a convolution result to a second convolutional layer, the second convolutional layer continues to perform the convolution encoding and output a convolution result until a $J^{th}$ convolutional layer outputs a convolution result, and the $J^{th}$ convolutional layer performs the convolution encoding on the convolution result output by the J-$1^{th}$ convolutional layer, to obtain the convolution embedding vector of the reference audio data, where J is the total number of the multiple cascaded convolutional layers, and J is a positive integer greater than 1. Thus, compared with processing by a single convolutional layer, the cascaded convolution processing improves accuracy of the convolution results, so as to facilitate subsequent encoding based on the accurate convolution embedding vector, and improve accuracy of the embedding vector of the reference audio data.

In some embodiments, the audio encoding is implemented by an encoder, the encoder including a recurrent neural network; and the encoding the convolution embedding vector of the reference audio data to obtain the reference embedding vector of the reference audio data includes: updating a hidden vector of the recurrent neural network and the convolution embedding vector of the reference audio data to obtain update information about the reference audio data; resetting the hidden vector of the recurrent neural network and the convolution embedding vector of the reference audio data to obtain reset information about the reference audio data; and performing, based on the update information about the reference audio data and the reset information about the reference audio data, context encoding on the convolution embedding vector of the reference audio data to obtain the reference embedding vector of the reference audio data.

For example, the recurrent neural network can solve a long dependence problem, and the recurrent neural network includes two gates: an update gate and a reset gate, respectively. The update gate is configured to control a degree to which the hidden vector of a previous status is brought into a current status, where a larger value of the update gate indicates that more hidden vectors are brought into the previous status. The reset gate controls how much information in the previous status is written to a candidate set of the current status, where a smaller value of the reset gate indicates that less information in the previous status is written. The hidden vector (representing a learnable vector carried by the recurrent neural network) of the recurrent neural network and the convolution embedding vector of the reference audio data are updated by the update gate in the recurrent neural network to obtain update information $z_t$ about the reference audio data, and are reset by the reset gate in the recurrent neural network to obtain reset information $r_t$ about the reference audio data; and based on the update information about the reference audio data and the reset information about the reference audio data, context encoding is performed on the convolution embedding vector $y_t$ of the reference audio data to obtain the reference embedding vector of the reference audio data. Thus, the recurrent neural network solves the long dependence problem of the reference audio data, and improves robustness of the embedding vector of the audio data.

In some embodiments, the updating a hidden vector of the recurrent neural network and the convolution embedding vector of the reference audio data to obtain update information about the reference audio data includes: splicing the hidden vector of the recurrent neural network and the convolution embedding vector of the reference audio data to obtain a first spliced vector; and mapping, based on the update gate, the first spliced vector to obtain the update information about the reference audio data.

For example, a vector updating process is as shown by the following formula: $z_t = \sigma(W_z \cdot [h_{t-1}, x_t])$, where a represents an activation function, $W_z$ represents a learnable parameter of the update gate, $h_{t-1}$ represents a hidden vector of the recurrent neural network, $x_t$ represents a convolution embedding vector of the reference audio data, [.] represents splicing, $z_t$ represents update information about the reference audio data, $[h_{t-1}, x_t]$ represents a first spliced vector, and a result of point $W_z$ multiplied by $[h_{t-1}, x_t]$ is activated through the activation function, so as to implement mapping based on the update gate.

In some embodiments, the resetting the hidden vector of the recurrent neural network and the convolution embedding vector of the reference audio data to obtain reset information about the reference audio data includes: splicing the hidden vector of the recurrent neural network and the convolution embedding vector of the reference audio data to obtain a second spliced vector; and mapping, based on the reset gate, the second spliced vector to obtain the reset information about the reference audio data.

For example, a vector resetting process is as shown by the following formula: $r_t=\sigma(W_r \cdot [h_{t-1}, x_t])$, where a represents the activation function, $W_r$ represents a learnable parameter of the reset gate, $h_{t-1}$ represents the hidden vector of the recurrent neural network, $x_t$ represents the convolution embedding vector of the reference audio data, [.] represents splicing, $r_t$ represents reset information about the reference audio data, $[h_{t-1}, x_t]$ represents a second spliced vector, and a result of $W_r$ multiplied by $[h_{t-1}, x_t]$ is activated through the activation function, so as to implement mapping based on the reset gate.

In some embodiments, the performing, based on the update information about the reference audio data and the reset information about the reference audio data, context encoding on the convolution embedding vector of the reference audio data to obtain the reference embedding vector of the reference audio data includes: mapping, based on a candidate vector, reset information about the target object, the hidden vector of the recurrent neural network, and a convolution embedding vector of the target object to obtain a candidate embedding vector of the reference audio data; and mapping the update information about the reference audio data, the hidden vector of the recurrent neural network, and the candidate embedding vector of the reference audio data to obtain the reference embedding vector of the reference audio data.

For example, a mapping process based on a candidate vector is as shown by the following formula: $\tilde{h}_t = \tan h(W_{\tilde{h}_t} \cdot [r_t * h_{t-1}, x_t])$, where $W_{\tilde{h}_t}$ represents a learnable parameter, $h_{t-1}$ represents the hidden vector of the recurrent neural network, $x_t$ represents the convolution embedding vector of the reference audio data, [.] represents splicing, * represents a product of a matrix, $r_t$ represents the reset information about the reference audio data, and $\tilde{h}_t$ represents a candidate embedding vector of the reference audio data.

For example, a vector mapping process is as shown by the following formula: $y_t=\sigma(W_0 \cdot ((1-z_t) * h_{t-1} + z_t * \tilde{h}_t))$, where $W_0$ represents a learnable parameter, σ represents the activation function, $h_{t-1}$ represents the hidden vector of the recurrent neural network, $z_t$ represents the update information about the reference audio data, and $y_t$ represents a reference embedding vector of the reference audio data.

Step 103: Perform tone-based attention processing on the reference embedding vector of the reference audio data to obtain a tone embedding vector of the target object.

For example, after the reference embedding vector of the reference audio data is obtained, attention processing is performed based on the reference embedding vector to obtain the tone embedding vector of the target object, where the attention processing can construct a more robust and accurate object embedding space, so that the tone embedding vector is separated from content of an audio. The tone embedding vector may represent a tone of the target object accurately, thereby improving naturalness of the generated audio and similarity with the target object.

The attention processing is implemented by an attention mechanism. In cognitive science, the attention mechanism is used for selectively focusing on a portion of all information while ignoring other information. The attention mechanism may provide a neural network with an ability to concentrate on a portion of input, that is, select particular input. In a case of limited computing power, the attention mechanism is a resource allocation scheme of main means to solve a problem of information overload, which allocates computing resources to more important tasks. This embodiment of this application is not limited to a form of the attention mechanism, for example, the attention mechanism may be multi-head attention, key-value pair attention, structured attention, or the like.

Based on the tone embedding vector of the target object, the electronic device 500 can generate audio data of a target text that conforms to a tone of the target object. For example, a user may input a target text (e.g., an article) into the electronic device 500 through the user interface 530. The electronic device 500 then generates audio data that simulates the tone of the target object (e.g., a famous person) when the target object reads the target text.

In some embodiments, as described below, the step of generating the audio data that conforms to or simulates the tone of the target object includes multiple operations as follows.

Figure 4:
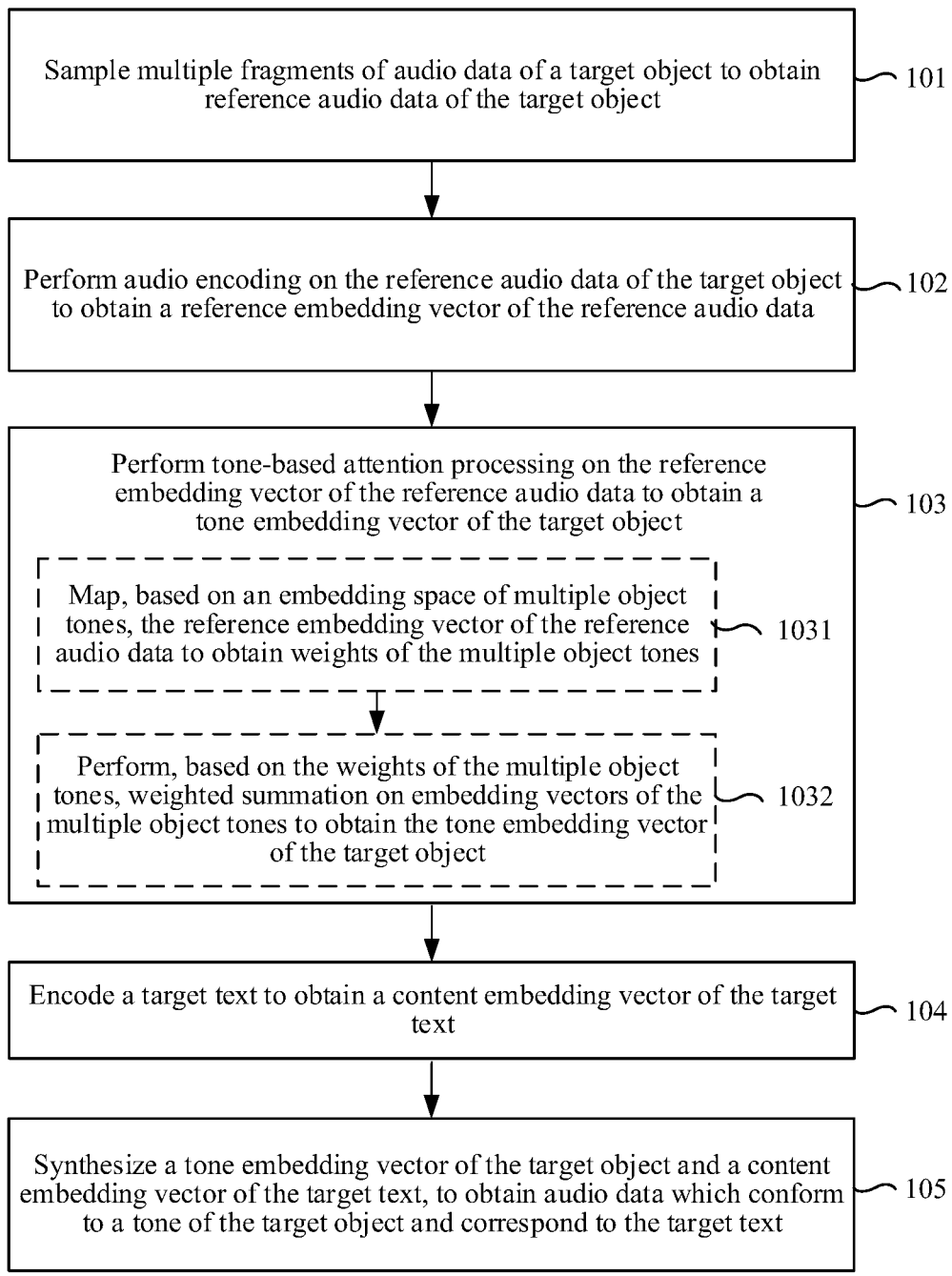

Refer to FIG. 4. FIG. 4 is a schematic flowchart of an audio processing method based on artificial intelligence according to an embodiment of this application, FIG. 4 shows that step 103 in FIG. 3 may be implemented by step 1031 and step 1032. Step 1031: Map, based on an embedding space of multiple object tones, the reference embedding vector of the reference audio data to obtain weights of the multiple object tones. Step 1032: Perform, based on the weights of the multiple object tones, weighted summation on embedding vectors of the multiple object tones to obtain the tone embedding vector of the target object.

Figure 8:
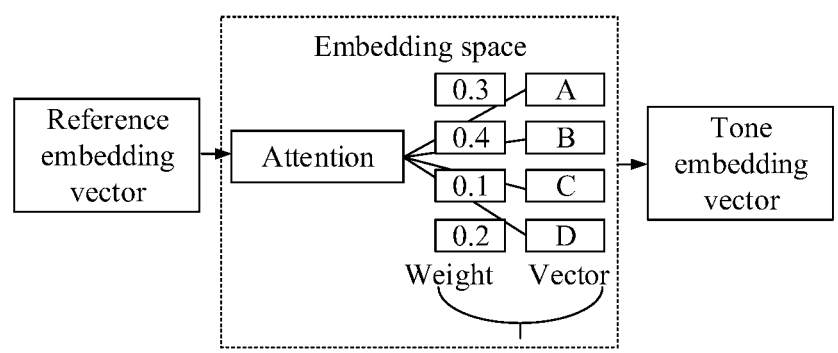
FIG. 8 is a schematic diagram of an embedding space according to an embodiment of this application.

As shown in FIG. 8, when the embedding space based on the multiple object tones has four object tones, respectively A, B, C, and D, the reference embedding vector of the reference audio data is mapped into the embedding space including the multiple object tones (that is, the reference embedding vector of the reference audio data is mapped based on the embedding space of the multiple object tones), to obtain a weight (0.3) of object tone A, a weight (0.4) of object tone B, a weight (0.1) of object tone C, and a weight (0.2) of the object tone D, and weighted summation is performed on the embedding vectors of the four object tones based on the weights of the four object tones, to obtain the tone embedding vector of the target object (that is, an embedding vector representing a tone of the target object). By mapping the reference embedding vector of the reference audio data into the embedding space including multiple object tones, the tone of the target object is identified accurately, so that audio data conforming to the tone of the target object are synthesized subsequently to improve accuracy of a synthesized audio.

Step 104: Encode a target text to obtain a content embedding vector of the target text.

As an example of obtaining a target text, a user inputs a target object and a target text through a terminal, then the terminal automatically generates a generation request for an audio and sends the generation request for an audio to a server, and the server parses the generation request for an audio to obtain the target text, and encodes the target text through a text encoder to obtain a content embedding vector (namely, an embedding vector representing text content of the target text) of the target text, so as to perform audio synthesis subsequently in combination with the tone embedding vector to implement personalized audio customization.

The text encoding is implemented by compressing a text through the text encoder in a neural network, so as to compress and convert the target text (analog signal) into the content embedding vector (digital signal). This embodiment of this application does not limit a model structure of the text encoder, for example, the encoder may be a convolutional neural network, a recurrent neural network, or a deep neural network.

Step 105: Synthesize the tone embedding vector of the target object and the content embedding vector of the target text, to obtain audio data which conform to a tone of the target object and correspond to the target text.

For example, because the tone embedding vector can accurately represent the tone of the target object, audio synthesis based on the tone embedding vector of the target object and the content embedding vector of the target text can obtain audio data which conform to the tone of the target object and correspond to the target text, and the synthesized audio data are similar to the real audio data of the target object, so that the synthesized audio data are more realistic. Compared with a related technology in which accurate audio synthesis cannot be implemented, this application can improve efficiency of the audio synthesis, thereby saving relevant computing resources.

In some embodiments, the synthesizing the tone embedding vector of the target object and the content embedding vector of the target text, to obtain audio data which conform to a tone of the target object and correspond to the target text includes: aligning the tone embedding vector of the target object and the content embedding vector of the target text to obtain an aligned vector of the target text; decoding the aligned vector of the target text to obtain an acoustic feature sequence of the target text; and performing acoustic feature conversion on the acoustic feature sequence, to obtain audio data which conform to the tone of the target object and correspond to the target text.

For example, the aligning is used for calculating, in combination with the tone embedding vector of the target object, a probability that each character in the target text is selected, and a value of the aligned vector is the probability (or a degree of attention) that each character in the input target text is selected, and represents an alignment relationship between the input target text and the output audio. The tone embedding vector of the target object and the content embedding vector of the target text are aligned to obtain an aligned vector of the target text, the aligned vector of the target text is decoded to obtain an acoustic feature sequence of the target text, and acoustic feature conversion is performed on the acoustic feature sequence through a vocoder, to obtain audio data which conform to the tone of the target object and correspond to the target text, that is, the acoustic feature sequence is converted into synthesized speech data matching a sequence of the input target text. The acoustic feature sequence may specifically be a Mel-spectrogram sequence, and an acoustic feature corresponding to each phoneme in the acoustic feature sequence is an acoustic feature of the target object, for example, the target text has a length of 100 (that is, includes 100 characters), then the acoustic feature corresponding to each character may be determined as an acoustic feature of the target object, and the acoustic features corresponding to the 100 characters may form an acoustic feature sequence. When the acoustic features are 1*5-dimensional vectors, the acoustic feature sequence includes 100 1*5-dimensional vectors, which may form a 100*5-dimensional vector.

The vocoder may specifically be a network (WaveGlow network) for synthesizing a high-quality speech from a Mel-spectrogram by means of a stream, to implement parallelized speech synthesis. Alternatively, the vocoder may be a lightweight stream model (SqueezeWave network) which may be used for speech synthesis on a mobile side, to effectively improve a speed of speech synthesis. Alternatively, a vocoder such as Griffin-Lim, WaveNet, and Parallel may be used for synthesizing a speech from an acoustic feature sequence. An appropriate vocoder may be selected according to an actual requirement, which is not limited by the embodiments of this application.

Following the foregoing example, a process of acoustic feature conversion is as follows: smoothing the acoustic feature sequence to obtain frequency spectrum data corresponding to the acoustic feature sequence; and performing Fourier transform on the frequency spectrum data corresponding to the acoustic feature sequence, to obtain the audio data which conform to the tone of the target object and correspond to the target text.

Figure 5:
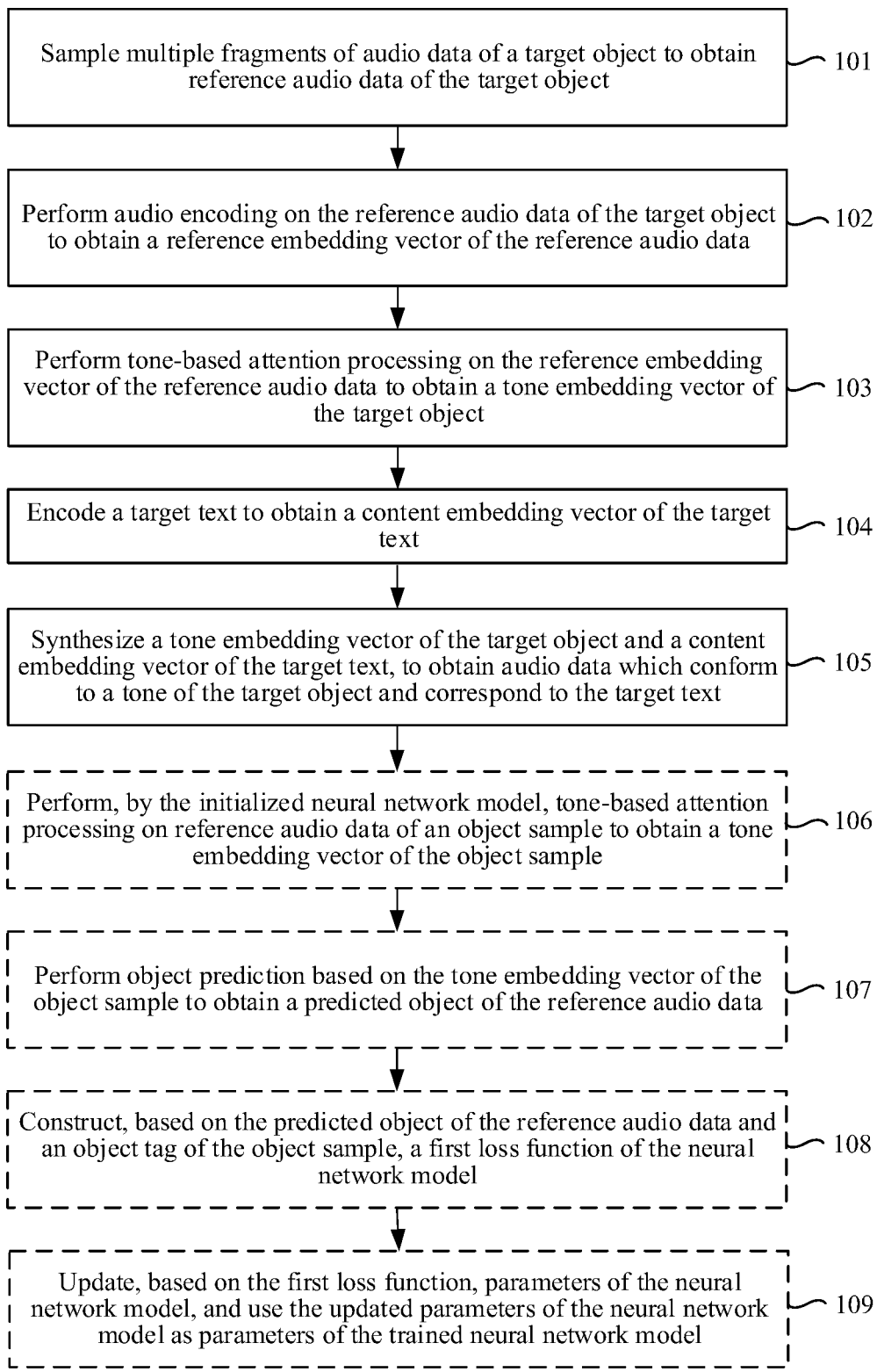

Refer to FIG. 5. FIG. 5 is a schematic flowchart of an audio processing method based on artificial intelligence according to an embodiment of this application. The audio processing method is implemented by invoking a neural network model. FIG. 5 shows a training process of the neural network model, namely, step 106 to step 109: Step 106: Perform, by the initialized neural network model, tone-based attention processing on reference audio data of an object sample to obtain a tone embedding vector of the object sample; Step 107: Perform object prediction based on the tone embedding vector of the object sample to obtain a predicted object of the reference audio data; Step 108: Construct, based on the predicted object of the reference audio data and an object tag of the object sample, a first loss function of the neural network model; and Step 109: Update, based on the first loss function, parameters of the neural network model, and use the updated parameters of the neural network model as parameters of the trained neural network model.

For example, the neural network model includes an encoder and a first classifier. The classifier is further added on the basis of the tone embedding vector in order to obtain tone embedding information independent of content and sentences of an audio and increase discrimination of different objects. Multiple fragments of audio data of the object sample are sampled to obtain reference audio data of the object sample, audio encoding is performed on the reference audio data of the object sample by the encoder to obtain a reference embedding vector of the reference audio data, tone-based attention processing is performed on the reference embedding vector of the reference audio data to obtain a tone embedding vector of the object sample, and object prediction is performed on the tone embedding vector of the object sample by the first classifier, to obtain a predicted object of the reference audio data (namely, a probability of a predicted object (speaker) corresponding to the reference audio data); after a value of the first loss function of the neural network model is determined based on the predicted object of the reference audio data and the object tag (namely, a real speaker tag) of the object sample, whether the value of the first loss function exceeds a preset threshold value may be determined; and when the value of the first loss function exceeds the preset threshold value, an error signal of the neural network model is determined based on the first loss function, the error signal is back propagated in the neural network model, and model parameters of each layer are updated during the propagation.

The attention processing is implemented by an attention mechanism. In cognitive science, the attention mechanism is used for selectively focusing on a portion of all information while ignoring other information. The attention mechanism may provide a neural network with an ability to concentrate on a portion of input, that is, select particular input. In a case of limited computing power, the attention mechanism is a resource allocation scheme of main means to solve a problem of information overload, which allocates computing resources to more important tasks. This embodiment of this application is not limited to a form of the attention mechanism, for example, the attention mechanism may be multi-head attention, key-value pair attention, structured attention, or the like.

As an example, a calculation formula of the first loss function is $L_{spk}=\Sigma_{r=1}^{N}CE(e_m^r, s_m^r)$, where N represents the number of corresponding texts corresponding to the reference audio data of the object sample m, $e_m^r$ represents object prediction performed on the tone embedding vector of the object sample by the first classifier to obtain a predicted object of the reference audio data, $s_m^r$ represents an object tag, CE represents a cross entropy loss, and $L_{spk}$ represents the first loss function. The embodiments of this application are not limited to the calculation formula $L_{spk}=\Sigma_{r=1}^{N}CE(e_m^r, s_m^r)$.

Here, the back propagation is described. Training sample data are input to an input layer of the neural network model, pass through a hidden layer, and finally arrive at an output layer, and a result is output. This is a forward propagation process of the neural network model. Because there is an error between the output result of the neural network model and the actual result, the error between the output result and the actual value is calculated, and the error is back propagated from the output layer to the hidden layer until the error is propagated to the input layer. In a process of back propagation, values of the model parameters are adjusted according to the error, that is, a loss function is constructed according to the error between the output result and the actual value, a partial derivative of the loss function with regard to the model parameters is calculated layer by layer, and a gradient of the loss function with regard to the model parameters on each layer is generated. Because a direction of the gradient indicates a direction of error expansion, the gradient with regard to the model parameters is inverted and summed with the original parameters of the model of each layer, and the obtained summation result is used as an updated model parameter of each layer, so as to reduce the error caused by the model parameters; and the foregoing process is iterated until convergence.

In some embodiments, before the parameters of the neural network model are updated based on the first loss function, at least one of the following processing is performed by the initialized neural network model: encoding a text sample to obtain a content embedding vector of the text sample, and constructing, based on the content embedding vector of the text sample, a second loss function of the neural network model; and constructing, based on the tone embedding vector of the object sample and the content embedding vector of the text sample, a third loss function of the neural network model. At least one of the second loss function and the third loss function is used in combination with the first loss function (a manner of combination may be addition, weighted summation based on an attention mechanism, or the like), to update the parameters of the neural network model.

For example, the neural network model further includes a text encoder and a second classifier. In order to maximize information that can be shared between different objects, namely, the text encoder is shared by all the objects, an adversarial training mechanism is introduced into the text encoder, namely, a second classifier with a gradient reversal layer is added after the text encoder to prevent text encoding from capturing object information. The text sample is encoded by the text encoder to obtain a content embedding vector of the text sample, object prediction is performed on the content embedding vector of the text sample by the second classifier to obtain a predicted object of the text sample, a fourth loss function is constructed based on the predicted object of the text sample and an object tag of the object sample, and the fourth loss function is reversed to obtain a second loss function of the neural network model. By the adversarial training mechanism, the text encoding is prevented from capturing object information, so as to separate the text from the object information, decouple the text from the object information, improve the accuracy of the content embedding vector, and avoid coupling with other information.

As an example, a calculation formula of the fourth loss function is $L_1=\mu\Sigma_{i=1}^{N}CE(t_m^i, s_m^i)$, where $\mu$ represents a scaling factor, N represents the number of texts corresponding to the reference audio data of the text sample m, $t_m^i$ represents object prediction performed on the content embedding vector of the text sample by the second classifier to obtain a predicted object of the text sample (namely, a probability of a predicted object (speaker) corresponding to the text sample), $s_m^i$ represents an object tag, and CE represents a cross entropy loss. A calculation formula of the second loss function is $L_{txt}=-L_1$. The embodiments of this application are not limited to the calculation formula $L_1=\mu\Sigma_{i=1}^{N}CE(t_m^i, s_m^i)$.

For example, to help speech synthesis learn better an aligning relationship between a text and an audio when a small volume of data, the neural network model is trained by using some relationships between the text and the audio, that is, multiple kinds of different alignment information between texts and audios are introduced. Synthesis processing is performed on the tone embedding vector of the target object and the content embedding vector of the target text, to obtain audio data which conform to a tone of the target object and correspond to the target text. First, alignment prediction is performed on the tone embedding vector of the object sample and the content embedding vector of the text sample to obtain predicted alignment information $\alpha_{t't}$ about the text sample, and then force-alignment based on speech recognition is performed on the tone embedding vector of the object sample and the content embedding vector of the text sample to obtain force-alignment information $A^*_{t't}$ about the text sample; the number of characters of the text sample and the number of audio frames of an audio data sample are linearly mapped to obtain linear alignment information $A'_{t't}$ about the text sample; and the third loss function of the neural network model is constructed based on the predicted alignment information about the text sample, the force-alignment information about the text sample, and the linear alignment information about the text sample. Thus, an aligning relationship between a text and an audio is better learned when a small volume of data through the alignment information (namely, the predicted alignment information, the force-alignment information, and the linear alignment information), and the neural network model is trained by using some relationships between the text and the audio, so that the trained neural network model can perform an accurate alignment operation to improve accuracy of speech synthesis.

An aligning relationship between a text and an audio is learned by an acoustic model in speech synthesis, and then alignment prediction is performed on the tone embedding vector of the object sample and the content embedding vector of the text sample by the acoustic model, to obtain predicted alignment information $\alpha_{t't}$ about the text sample. The acoustic model is one of the most important parts in a speech recognition system, and is mostly built by using a hidden Markov model (a discrete time-domain finite state automata), and the acoustic model is configured to extract acoustic features from an audio.

An aligning relationship between a text and an audio is learned by means of an automatic speech recognition (ASR) algorithm, and then force-alignment (also referred to as Viterbi alignment) based on speech recognition is performed on the tone embedding vector of the object sample and the content embedding vector of the text sample by means of the ASR algorithm, to obtain force-alignment information $A^*_{t't}$ about the text sample. The force-alignment refers to determining a location of each phoneme in an audio when the audio and a text are given. For example, the force-alignment may be implemented by a Viterbi decoding technology. Viterbi decoding is a dynamic programming algorithm.

The linear alignment information $A'_{t't}$ about the text sample is an approximately linearly monotonic corresponding relationship (namely, an alignment graph, a diagonal relationship between an input text sample and an output audio data sample) between a text and an audio. A calculation formula of the linear alignment information is $$A'_{t't} = 1 - \exp\left\{-\left\{\frac{\left(\frac{t'}{T'} - \frac{t}{T}\right)^2}{2g^2}\right\}\right\},$$

where T' represents a maximum number of characters of the input text sample, t' represents the input $t'^{th}$ character, T represents a maximum number of output audio frames, t represents the output $t^{th}$ audio frame, and g represents a scaling factor.

Continue the foregoing example. The constructing the third loss function of the neural network model based on the predicted alignment information about the text sample, the force-alignment information about the text sample, and the linear alignment information about the text sample includes: constructing, based on a difference between the linear alignment information about the text sample and the predicted alignment information about the text sample, first difference information; constructing, based on a difference between the force-alignment information about the text sample and the predicted alignment information about the text sample, second difference information; and performing weighted summation on the first difference information and the second difference information to obtain the third loss function of the neural network model.

For example, the first difference information is $A'_{t't} - \alpha_{t't}$, the second difference information is $A^*_{t't} - \alpha_{t't}$, and a calculation formula of the third loss function is $$L_{ali} = \frac{1}{T'}\sum_{t'=1}^{T'}\sum_{t=1}^{T}\{(A'_{t't} - \alpha_{t't})^2 + (A^*_{t't} - \alpha_{t't})^2\},$$

where $\alpha_{t't}$ represents predicted alignment information, and $A^*_{t't}$ represents force-alignment information obtained by automatic speech recognition (ASR). If the difference between $\alpha_{t't}$ and $A'_{t't}$, or between $\alpha_{t't}$ and $A^*_{t't}$ is greater, a greater penalty will be obtained. This training strategy based on multi-alignment information can avoid sensitivity of the scaling factor g by introducing a matrix $A^*_{t't}$ obtained in the ASR, and can also avoid the influence of an alignment deviation in force-alignment by $A'_{t't}$. The embodiments of this application are not limited to the calculation formula $$L_{ali} = \frac{1}{T'}\sum_{t'=1}^{T'}\sum_{t=1}^{T}\{(A'_{t't} - \alpha_{t't})^2 + (A^*_{t't} - \alpha_{t't})^2\},$$

Hereinafter, an exemplary application of the embodiments of this application in an actual speech synthesis scenario is described.

The embodiments of this application may be applied to various scenarios of speech synthesis (for example, smart devices with speech synthesis capabilities such as a smart speaker, a screen speaker, a smart watch, a smart phone, a smart home, a smart map, and a smart car, and applications with speech synthesis capabilities such as XX news, XX listening to books, on-line education, an intelligent robot, an artificial intelligence customer service, and a speech synthesis cloud service). For example, for a vehicle-mounted application, when a user is driving, it is inconvenient to learn information in a form of a text, but the information can be learned by reading a speech, to avoid missing important information. After a vehicle client receives the text, the text needs to be converted into a speech for playing to the user, so that the user can read the speech corresponding to the text in time.

In order to solve problems of speech synthesis customization acoustic modeling methods in related technologies, an embodiment of this application provides an audio processing method based on artificial intelligence. The method can separate speaker (namely, an object) information from text content information in a modeling process. In the method, features of the speaker information are extracted by an audio encoder (also referred to as an encoder) with a random sampling mechanism and a speaker classifier, so as to ensure that the obtained speaker information does not have information related to a rhythm or a style. This method provides an adversarial training strategy to separate speaker-related information from a text encoder. For faster and more effective custom training and full use of a correlation between a text and an audio, an attention loss based on multi-alignment information is further provided to assist model learning.

Figure 9:
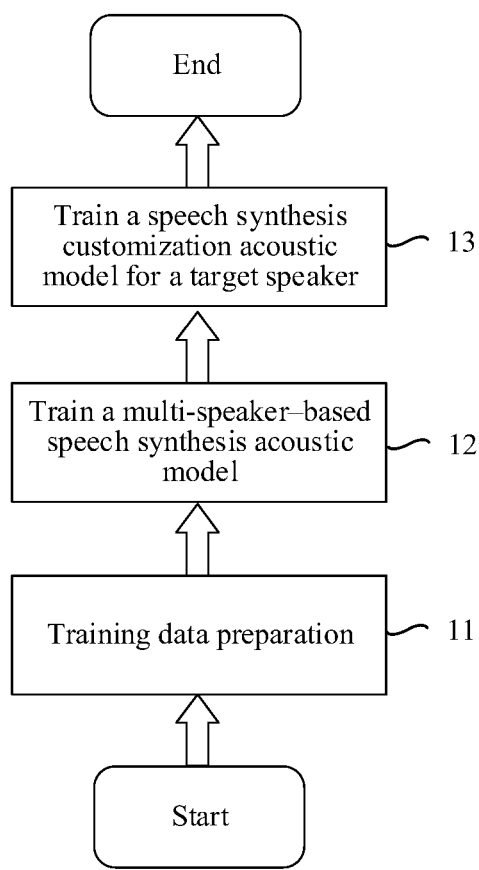
FIG. 9 is a flowchart of training according to an embodiment of this application.

For fast, accurate, stable, and efficient speech synthesis and acoustic model customization, an embodiment of this application provides an audio processing method based on artificial intelligence. Refer to FIG. 9. FIG. 9 is a training flowchart according to an embodiment of this application, which mainly includes three steps:

Step 11: Training data preparation, including text pre-processing, acoustic feature extraction, and phoneme information extraction.

Step 12: Train, by using given data, a multi-speaker—based speech synthesis acoustic model (namely, a neural network model) as an initial model for training a customization acoustic model.

Step 13: Train a speech synthesis customization model for a target speaker by using data of the given target speaker (namely, a target object) and using the method provided by the embodiments of this application.

Figure 10:
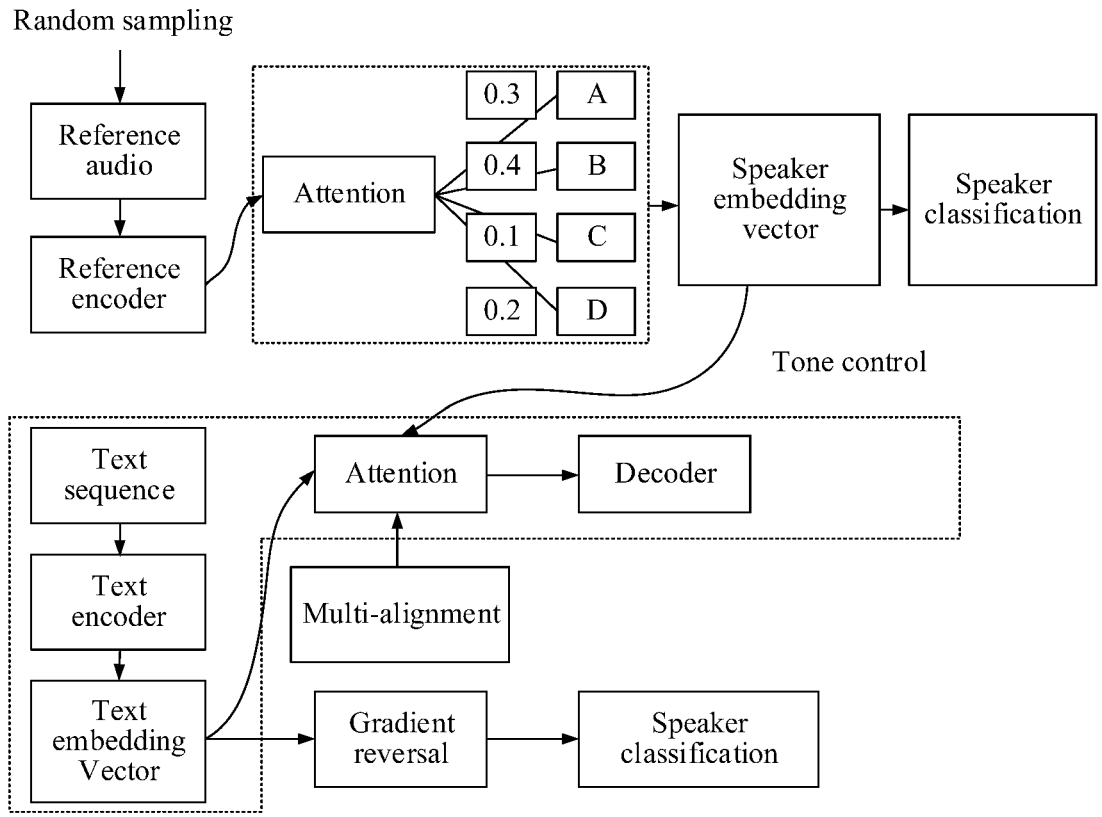
FIG. 10 is a schematic diagram of a fast and efficient speech synthesis customization model structure according to an embodiment of this application.

Refer to FIG. 10. FIG. 10 is a schematic diagram of a fast and efficient speech synthesis customization model structure according to an embodiment of this application. The structure mainly includes a speaker encoder with a random sampling mechanism, a speaker attention module, and a speaker classifier, a text encoder with speaker adversarial training, and a sequence-to-sequence codec-based end-to-end acoustic model with a multi-alignment mechanism.

As shown in FIG. 10, the first part is a speaker encoder. In order to allow the speaker encoder to focus more on depicting a speaker's tone while ignoring information related to audio content such as a rhythm and a style, an embodiment of this application provides an encoder with a random sampling mechanism. For a given text and audio pair $\{x_m^i, y_m^i\}$, $i \in [1, N]$, where N represents the number of texts of an audio of a speaker (namely, an object), based on the random sampling mechanism, an audio data is first randomly sampled from a corpus corresponding to speaker m as input of a reference encoder (also referred to as an encoder), as shown in formula (1):

$$y^r = y^{Random(N)} \tag{1}$$

Random(N) represents any positive integer in [1, N], and $y^r$ represents a fragment of audio data randomly sampled from the corpus corresponding to speaker m as reference audio data. The audio data may be modeled based on characters or phonemes, and a maximum sequence length is defined as 256.

Figure 11:
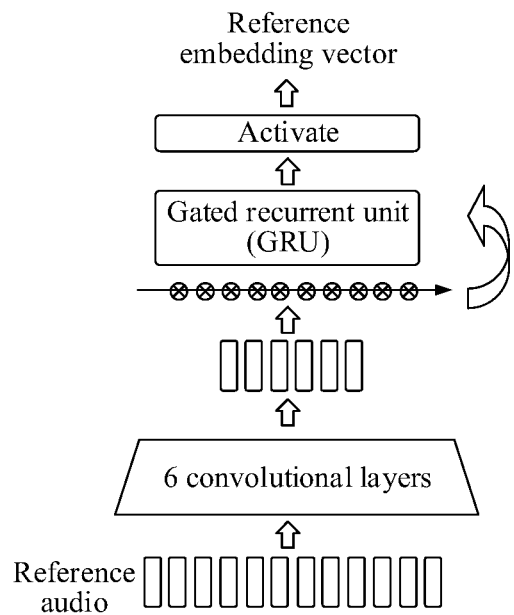
FIG. 11 is a block diagram of a specific structure of an encoder according to an embodiment of this application.

The sampled audio data $y^r$ is directly sent to a reference encoder for encoding, and the reference encoder encodes the variable-length audio data $y^r$ and outputs a corresponding reference embedding vector. Refer to FIG. 11. FIG. 11 is a block diagram of a specific structure of a reference encoder according to an embodiment of this application. An input reference audio is subjected to multi-layer CNN encoding (for example, 6 convolutional layers) and then sent to a one-way gated recurrent unit (GRU) (for example, a gated recurrent grid including 128 nodes), and then a representation of the one-way GRU at the last moment is used as a reference embedding vector.

The foregoing reference embedding vector can already be used directly as a speaker embedding vector to control a speaker's tone. In order to construct a more robust and accurate speaker embedding space, this embodiment of this application further introduces a speaker attention layer. As shown in FIG. 10, the speaker embedding space includes M different types of speaker token (namely, different objects), and each speaker m embedding representation may be represented by a linear combination of the M speaker tokens. In this case, further diversified representation of the speaker embedding space can help to improve representation robustness of the speaker embedding space, thereby improving naturalness of a generated audio and a similarity between a tone of the generated audio and a tone of the speaker.

In order to obtain speaker embedding information independent of content of the audio and increase discrimination of different speakers, a speaker classifier (for speaker classification, namely, a first classifier) is further added on the basis of the speaker embedding vector. With regard to the audio data $y^r$ obtained by random sampling in the speaker $m \in [1, S]$, where S represents the number of speakers, and a speaker loss function may be represented as a cross entropy (CE) loss (namely, a first loss function) between a target speaker tag $s_m^r$ and a speaker probability $e_m^r$ (namely, a probability of a predicted object) which is predicted based on a speaker embedding vector (namely, a tone embedding vector), as shown in formula (2):

$$L_{spk} = \Sigma_{r=1}^{N} CE(e_m^r, s_m^r) \tag{2}$$

N represents the number of texts corresponding to the audio data $y^r$ of speaker m, and $L_{spk}$ represents a speaker loss function. The speaker loss function helps to obtain a consistent speaker embedding vector from different audios of the same speaker.

As shown in FIG. 10, the second part is a text encoder based on speaker adversarial training. In order to maximize information that can be shared between different speakers, namely, the text encoder is shared by all the speakers, an adversarial training mechanism is introduced into the text encoder in this embodiment of this application, namely, a speaker classifier with a gradient reversal layer is added after the text encoder to prevent text encoding from capturing speaker information, as shown in formula (3):

$$L_{txt} = \mu \Sigma_{i=1}^{N} CE(t_m^i, s_m^i) \tag{3}$$

$\mu$ represents a scaling factor, N represents the number of texts corresponding to the audio data $y^r$ of speaker m, $t_m^i$ represents a speaker probability predicted based on a text embedding vector, $s_m^i$ represents a target speaker tag, CE represents a cross entropy loss, and $L_{txt}$ represents a second loss function. Because it is not necessary to learn parameters of the text encoder based on each speaker, a training speed can be increased by adversarial training.

As shown in FIG. 10, the third part is a training strategy based on multi-alignment information guidance. In order to help the speech synthesis customization model learn an alignment relationship between a text and an audio better when a small volume of data, the model is trained by using some relationships between the text and the audio in this embodiment of this application, that is, multiple kinds of different pre-alignment information between the text and the audio are introduced, one kind of alignment information is derived from force-alignment (namely, a matrix $A^*_{t't}$ in formula (5)) in speech recognition, and another kind of linear alignment information assumes an approximately linearly monotonic corresponding relationship (namely, an alignment graph, a diagonal relationship between an input text and an output audio) between the text and the audio. The linear alignment information is as shown in formula (4):

$$A'_{t't} = 1 - \exp\left\{-\frac{\left(\frac{t'}{T'} - \frac{t}{T}\right)^2}{2g^2}\right\} \tag{4}$$

T' represents a maximum number of input characters, t' represents the input t' character, T represents a maximum number of output acoustic feature frames, t represents the output $t^{th}$ acoustic feature frame, and g represents a scaling factor (for example, 0.2). T' represents a maximum number of input characters, t' represents the input t' character, T represents a maximum number of output acoustic feature frames, t represents the output $t^{th}$ acoustic feature frame, and g represents a scaling factor (for example, 0.2).

An attention loss function (namely, a third loss function) of the multi-alignment information is as shown in formula (5):

$$L_{ali} = \frac{1}{T'} \Sigma_{t'=1}^{T'} \Sigma_{t=1}^{T} \{(A'_{t't} - \alpha_{t't})^2 + (A^*_{t't} - \alpha_{t't})^2\} \tag{5}$$

$\alpha_{t't}$ represents alignment information between a text and an audio obtained by acoustic model learning, and $A^*_{t't}$ represents alignment information between the text and the audio obtained by automatic speech recognition (ASR). If the difference between $\alpha_{t't}$ and $A'_{t't}$, or between $\alpha_{t't}$ and $A^*_{t't}$ is greater, a greater penalty will be obtained. This training strategy based on multi-alignment information can avoid sensitivity of parameter g in formula (4) by introducing a matrix $A^*_{t't}$ obtained in the ASR, and can also avoid the influence of an alignment deviation in ASR force-alignment by $A'_{t't}$.

The method provided in the embodiments of this application is tested on recorded Chinese speech synthesis corpora, and about 120 hours of Chinese Mandarin corpora of a total of 60 speakers are used for training. In this embodiment of this application, a subjective mean opinion score (MOS) of naturalness and similarity is used as a final evaluation index.

For speaker embedding space verification, three different speaker embedding space modeling methods are compared, including a one-hot representation method in related technologies, a speaker encoding method in related technologies, and a speaker encoder (SE) method provided by the embodiments of this application. A target speaker is randomly selected for ablation study. Experiments show that results generated by using the speaker encoding method in the related technologies are unstable and a synthesized text does not match content of a reference audio.

Based on 20 audio pairs (excluded in a training set), AB preference tests are performed on the one-hot representation method in the related technologies and the speaker encoder (SE) method provided by the embodiments of this application. Results of the AB preference tests are shown in Table 1:

TABLE 1

| AB preference test | | |
|---|---|---|
| Model | SE | One-hot |
| AB preference test | 56.1% | 20.5% |

As can be seen from Table 1, the audio processing method based on artificial intelligence according to the embodiments of this application can obtain more preferences, because the extracted speaker embedding vector contains speaker feature related information which helps to decode acoustic features of a corresponding speaker. Meanwhile, a speaker classifier is added to the speaker encoder (SE), to ensure that the speaker embedding vector has better discrimination for different speakers, so as to better control speaker features in a subsequent decoding process. In addition, the speaker embedding vector provided in the embodiments of this application may be computed off line in advance, so any additional computational cost will not be brought in an inference process.

Based on the speaker encoder (SE), adversarial training (SE+AT) is introduced to eliminate speaker information in the text encoder. AB preference test results are shown in Table 2:

TABLE 2

| AB preference test | | |
|---|---|---|
| Model | SE + AT | SE |
| AB preference test | 48.2% | 20.3% |

It can be seen from Table 2 that adding adversarial training can further improve test effects, because the adversarial training can maximize sharing of information between speakers.

On customization of a minute quantity of corpus (20 sentences per speaker), test results of the embodiments of this application are shown in table 3. A baseline model (Baseline) employs a speech synthesis customization method in related technologies, and a speech synthesis customization model (Proposed) provided by the embodiments of this application:

TABLE 3

MOS values for building a speech synthesis customization acoustic model with a minute quantity of corpus

| Model | Speaker identifier | Baseline | Proposed |
|---|---|---|---|
| Naturalness | 1 | 4.08 ± 0.07 | 4.22 ± 0.09 |
| | 2 | 3.24 ± 0.10 | 3.75 ± 0.05 |
| | 3 | 3.65 ± 0.05 | 3.85 ± 0.08 |
| | 4 | 4.00 ± 0.09 | 4.17 ± 0.08 |
| Similarity | 1 | 4.11 ± 0.05 | 4.28 ± 0.08 |
| | 2 | 3.59 ± 0.13 | 3.97 ± 0.03 |
| | 3 | 3.81 ± 0.09 | 4.15 ± 0.02 |
| | 4 | 4.04 ± 0.06 | 4.25 ± 0.05 |

It can be seen from table 3 that the audio processing method based on artificial intelligence according to the embodiments of this application achieves better performance than the Baseline. It can be seen from table 3 that the audio processing method based on artificial intelligence according to the embodiments of this application achieves better performance than the Baseline.

Meanwhile, the embodiments of this application also achieve significant performance improvement and faster convergence speed in a case of different speakers and different corpus sizes, as shown in table 4:

TABLE 4

MOS values for building a speech synthesis customization acoustic model in a case of different speakers and different corpus sizes

| Model | Corpus size | Baseline | Proposed |
|---|---|---|---|
| Naturalness | 100 | 3.66 ± 0.05 | 4.01 ± 0.02 |
| | 1000 | 4.15 ± 0.08 | 4.31 ± 0.06 |
| | 2000 | 4.30 ± 0.05 | 4.40 ± 0.04 |
| | 10000 | 4.39 ± 0.04 | 4.45 ± 0.04 |
| Similarity | 100 | 3.81 ± 0.07 | 4.17 ± 0.04 |
| | 1000 | 4.20 ± 0.05 | 4.36 ± 0.05 |
| | 2000 | 4.28 ± 0.04 | 4.35 ± 0.02 |
| | 10000 | 4.67 ± 0.05 | 4.73 ± 0.05 |

It can be seen from the foregoing tables that the audio processing method based on artificial intelligence according to the embodiments of this application achieve higher naturalness and similarity than the related technologies in the recorded speech synthesis corpora and in the case of different speakers and different corpus sizes, synthesizes an audio with better definition and naturalness and clear spectral details, and greatly shortens time for training and convergence of a customization synthesis model.

It can be seen from the foregoing tables that the audio processing method based on artificial intelligence according to the embodiments of this application achieve higher naturalness and similarity than the related technologies in the recorded speech synthesis corpora and in the case of different speakers and different corpus sizes, synthesizes an audio with better definition and naturalness and clear spectral details, and greatly shortens time for training and convergence of a customization synthesis model.

In summary, the audio processing method based on artificial intelligence according to the embodiments of this application has the following beneficial effects:

1) An audio is randomly sampled from all audio data as information of a speaker encoder, so as to ensure that the obtained speaker embedding vector is independent of content of the audio; in addition, a speaker classifier is further introduced to ensure better discrimination for different speakers;
2) In order to learn a speaker-independent text better, a speaker adversarial training mechanism is introduced to cause the text encoder unable to distinguish which speaker the text belongs to, so as to maximize information that can be shared between different speakers; and
3) By making full use of a correlation between a training text and an audio, a loss function of a multi-alignment mechanism is introduced, thereby effectively improving a convergence speed and stability of the model.

So far, the audio processing method based on artificial intelligence according to the embodiments of this application has been described in conjunction with exemplary applications and implementations of the server provided by the embodiments of this application. An embodiment of this application further provides an audio processing apparatus. In practical applications, each functional module in the audio processing apparatus may be implemented cooperatively by hardware resources of an electronic device (such as a terminal device, a server, or a server cluster), such as computing resources of a processor and the like, communication resources (for example, being used for supporting various modes of communication such as an optical cable and a cellular), and a memory. FIG. 2 illustrates an audio processing apparatus 555 stored in a memory 550. The audio processing apparatus 555 may be software in forms of a program and a plug-in, for example, be implemented in a manner of a software module designed in a programming language such as C/C++ or Java, application software designed in a programming language such as C/C++ or Java, or a dedicated software module, an application program interface, a plug-in, or a cloud service in a large software system. Different implementations are exemplified below.

Example 1. The Audio Processing Apparatus is a Mobile-Side Application Program or Module The audio processing apparatus 555 in this example of this application may be provided as a software module designed in a programming language such as software C/C++ or Java, and the software module is embedded in various mobile side applications based on a system such as Android or iOS (stored in a storage medium of a mobile side as executable instructions, and executed by a processor of the mobile side), so that computing resources of the mobile side are directly used to complete relevant audio synthesis tasks, and processing results are transmitted regularly or irregularly to a remote server in various network communication manners, or stored locally on the mobile side.

Example 2. The Audio Processing Apparatus is a Server Application Program or Platform The audio processing apparatus 555 in this example of this application may be provided as application software designed in a programming language such as C/C++ or Java, or as a dedicated software module in a large software system, the application software or the dedicated software module is run on a server (stored in a storage medium on the server in a form of executable instructions, and run by a processor at the server), and the server uses its own computing resources to complete relevant audio synthesis tasks.

The audio processing apparatus in this example of this application may also be provided, on a distributed and parallel computing platform composed of multiple servers, to mount a customized and easily interactive web interface or other user interfaces (UI), so as to form an audio synthesis platform (for audio synthesis) for use by individuals, groups, or units.

Example 3. The Audio Processing Apparatus is an Application Program Interface (API) or Plug-In of a Server Side The audio processing apparatus 555 in this example of this application may be provided as an API or plug-in on a server side, and the API or plug-in is invoked by a user to execute the audio processing method based on artificial intelligence according to the embodiments of this application, and is embedded into various types of application programs.

Example 4. The Audio Processing Apparatus is a Client API or Plug-In of a Mobile Device The audio processing apparatus 555 in this example of this application may be provided as an API or plug-in of a mobile device, and the API or plug-in is invoked by a user to execute the audio processing method based on artificial intelligence according to the embodiments of this application.

Example 5. The Audio Processing Apparatus is an Open Service of a Cloud

The audio processing apparatus 555 in this example of this application may be provided as an information recommendation cloud service developed to users, for individuals, groups, or units to obtain audios.

The audio processing apparatus 555 includes a series of modules, including a sampling module 5551, an audio encoding module 5552, an attention module 5553, a text encoding module 5554, a synthesis module 5555, and a training module 5556. The following continues to describe cooperation of the modules in the audio processing apparatus 555 according to the embodiments of this application to implement an audio processing scheme.

The sampling module 5551 is configured to sample multiple fragments of audio data of a target object to obtain reference audio data of the target object; the audio encoding module 5552 is configured to perform audio encoding on the reference audio data of the target object to obtain a reference embedding vector of the reference audio data; the attention module 5553 is configured to perform tone-based attention processing on the reference embedding vector of the reference audio data to obtain a tone embedding vector of the target object; the text encoding module 5554 is configured to encode a target text to obtain a content embedding vector of the target text; and the synthesis module 5555 is configured to synthesize the tone embedding vector of the target object and the content embedding vector of the target text, to obtain audio data which conform to a tone of the target object and correspond to the target text.

In some embodiments, the attention module 5553 is further configured to map, based on an embedding space of multiple object tones, the reference embedding vector of the reference audio data to obtain weights of the multiple object tones; and perform, based on the weights of the multiple object tones, weighted summation on embedding vectors of the multiple object tones to obtain the tone embedding vector of the target object.

In some embodiments, the audio encoding module 5552 is further configured to perform convolution processing on the reference audio data of the target object to obtain a convolution embedding vector of the reference audio data; and encode the convolution embedding vector of the reference audio data to obtain the reference embedding vector of the reference audio data.

In some embodiments, the audio encoding is implemented by an encoder, the encoder including multiple cascaded convolutional layers; and the audio encoding module 5552 is further configured to perform, by a first convolutional layer among the multiple cascaded convolutional layers, convolution processing on the reference audio data of the target object; and output a convolution result of the first convolutional layer to a subsequent cascaded convolutional layer, continue, by the subsequent cascaded convolutional layer, to perform the convolution processing and output a convolution result until a last convolutional layer outputs a convolution result, and use the convolution result output by the last convolutional layer as the convolution embedding vector of the reference audio data.

In some embodiments, the audio encoding is implemented by an encoder, the encoder including a recurrent neural network; and the audio encoding module 5552 is further configured to update a hidden vector of the recurrent neural network and the convolution embedding vector of the reference audio data to obtain update information about the reference audio data; reset the hidden vector of the recurrent neural network and the convolution embedding vector of the reference audio data to obtain reset information about the reference audio data; and perform, based on the update information about the reference audio data and the reset information about the reference audio data, context encoding on the convolution embedding vector of the reference audio data to obtain the reference embedding vector of the reference audio data.

In some embodiments, the audio encoding module 5552 is further configured to splice the hidden vector of the recurrent neural network and the convolution embedding vector of the reference audio data to obtain a spliced vector; and map, based on an update gate, the spliced vector to obtain the update information about the reference audio data.

In some embodiments, the audio encoding module 5552 is further configured to map, based on a candidate vector, reset information about the target object, the hidden vector of the recurrent neural network, and a convolution embedding vector of the target object to obtain a candidate embedding vector of the reference audio data; and map the update information about the reference audio data, the hidden vector of the recurrent neural network, and the candidate embedding vector of the reference audio data to obtain the reference embedding vector of the reference audio data.

In some embodiments, the synthesis module 5555 is further configured to align the tone embedding vector of the target object and the content embedding vector of the target text to obtain an aligned vector of the target text; decode the aligned vector of the target text to obtain an acoustic feature sequence of the target text; and perform acoustic feature conversion on the acoustic feature sequence, to obtain audio data which conform to the tone of the target object and correspond to the target text.

In some embodiments, the synthesis module 5555 is further configured to smooth the acoustic feature sequence to obtain frequency spectrum data corresponding to the acoustic feature sequence; and perform Fourier transform on the frequency spectrum data corresponding to the acoustic feature sequence, to obtain the audio data which conform to the tone of the target object and correspond to the target text.

In some embodiments, the audio processing method is implemented by invoking a neural network model; and the apparatus further includes: a training module 5556, configured to perform, by the initialized neural network model, tone-based attention processing on reference audio data of an object sample to obtain a tone embedding vector of the object sample; perform object prediction based on the tone embedding vector of the object sample to obtain a predicted object of the reference audio data; construct, based on the predicted object of the reference audio data and an object tag of the object sample, a first loss function of the neural network model; and update, based on the first loss function, parameters of the neural network model, and use the updated parameters of the neural network model as parameters of the trained neural network model.

In some embodiments, the training module 5556 is further configured to perform at least one of the following processing by the initialized neural network model: encode a text sample to obtain a content embedding vector of the text sample, and construct, based on the content embedding vector of the text sample, a second loss function of the neural network model; and construct, based on the tone embedding vector of the object sample and the content embedding vector of the text sample, a third loss function of the neural network model, where at least one of the second loss function and the third loss function is used in combination with the first loss function, to update the parameters of the neural network model.

In some embodiments, the training module 5556 is further configured to perform object prediction based on the content embedding vector of the text sample to obtain a predicted object of the text sample; construct, based on the predicted object of the text sample and the object tag of the object sample, a fourth loss function; and reverse the fourth loss function to obtain the second loss function of the neural network model.

In some embodiments, the training module 5556 is further configured to synthesize the tone embedding vector of the object sample and the content embedding vector of the text sample, to obtain an audio data sample which conforms to a tone of the object sample and corresponds to the text sample; perform alignment prediction on the tone embedding vector of the object sample and the content embedding vector of the text sample to obtain predicted alignment information about the text sample; perform force-alignment on the tone embedding vector of the object sample and the content embedding vector of the text sample to obtain force-alignment information about the text sample; linearly map the number of characters of the text sample and the number of audio frames of the audio data sample to obtain linear alignment information about the text sample; and construct the third loss function of the neural network model based on the predicted alignment information about the text sample, the force-alignment information about the text sample, and the linear alignment information about the text sample.

In some embodiments, the training module 5556 is further configured to construct, based on a difference between the linear alignment information about the text sample and the predicted alignment information about the text sample, first difference information; construct, based on a difference between the force-alignment information about the text sample and the predicted alignment information about the text sample, second difference information; and perform weighted summation on the first difference information and the second difference information to obtain the third loss function of the neural network model.

An embodiment of this application provides a computer program product or a computer program. The computer program product or the computer program includes computer instructions. The computer instructions are stored in a computer-readable storage medium. A processor of a computer device reads the computer instructions from the computer-readable storage medium, the processor executes the computer instructions, and the computer device is enabled to perform the foregoing audio processing method based on artificial intelligence according to the embodiments of this application.

An embodiment of this application provides a non-transitory computer-readable storage medium storing executable instructions that, when executed by a processor, cause the processor to perform the audio processing method based on artificial intelligence according to the embodiments of this application, for example, the audio processing method based on artificial intelligence as shown in FIG. 3 to FIG. 5.

In some embodiments, the computer-readable storage medium may be a memory such as an FRAM, a ROM, a PROM, an EPROM, an EEPROM, a flash memory, a magnetic surface storage, an optical disk, or a CD-ROM, or may also be various devices including one or any combination of the foregoing memories.

In some embodiments, the executable instructions may be in any form of a program, software, a software module, a script, or code, may be written in any form of programming language (including a compiled or interpreted language, or a declarative or procedural language), and may be deployed in any form, including as a stand-alone program or as modules, components, subroutines, or other units suitable for use in a computing environment.

As an example, the executable instructions may, but need not, correspond to a file in a file system, and may be stored in a portion of a file that saves another program or data, for example, stored in one or more scripts in a hyper text markup language (HTML) document, stored in a single file dedicated to a program discussed, or stored in multiple coordinated files (for example, files that store one or more modules, subroutines, or portions of code).

As an example, the executable instructions may be deployed to be executed on one computing device, or on multiple computing devices at one site, or on multiple computing devices distributed across multiple sites and interconnected by a communication network.

It can be understood that the embodiments of this application involve user-related data such as audio data; when the embodiments of this application are applied to a specific product or technology, user permission or consent is required; and collection, use and processing of relevant data is required to comply with relevant national and regional laws and regulations and standards.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely embodiments of this application, and are not intended to limit the protection scope of this application. Any modification, equivalent replacement, improvement, and the like made within the spirit and scope of this application fall within the protection scope of this application.

What is claimed is:

1. An audio processing method performed by an electronic device, the method comprising:
　　sampling multiple fragments of audio data of a target object to obtain reference audio data of the target object;
　　performing audio encoding on the reference audio data of the target object to obtain a reference embedding vector of the reference audio data;
　　performing tone-based attention processing on the reference embedding vector of the reference audio data to obtain a tone embedding vector of the target object, wherein the tone embedding vector is independent from content of the audio data;
　　encoding a target text to obtain a content embedding vector of the target text;
　　aligning the tone embedding vector of the target object and the content embedding vector of the target text to obtain an aligned vector of the target text;
　　decoding the aligned vector of the target text to obtain an acoustic feature sequence of the target text; and
　　performing acoustic feature conversion on the acoustic feature sequence, to obtain audio data of the target text.

2. The method according to claim 1, wherein the performing tone-based attention processing on the reference embedding vector of the reference audio data to obtain a tone embedding vector of the target object comprises:
　　mapping, based on an embedding space of multiple object tones, the reference embedding vector of the reference audio data to obtain weights of the multiple object tones; and
　　performing, based on the weights of the multiple object tones, weighted summation on embedding vectors of the multiple object tones to obtain the tone embedding vector of the target object.

3. The method according to claim 1, wherein the performing audio encoding on the reference audio data of the target object to obtain a reference embedding vector of the reference audio data comprises:
　　performing convolution processing on the reference audio data of the target object to obtain a convolution embedding vector of the reference audio data; and
　　encoding the convolution embedding vector of the reference audio data to obtain the reference embedding vector of the reference audio data.

4. The method according to claim 3, wherein
　　the audio encoding is implemented by an encoder, the encoder comprising multiple cascaded convolutional layers; and
　　the performing convolution processing on the reference audio data of the target object to obtain a convolution embedding vector of the reference audio data comprises:
　　performing, by a first convolutional layer among the multiple cascaded convolutional layers, convolution processing on the reference audio data of the target object; and outputting a convolution result of the first convolutional layer to a subsequent cascaded convolutional layer, continuing, by the subsequent cascaded convolutional layer, to perform the convolution processing and output a convolution result until a last convolutional layer outputs a convolution result, and using the convolution result output by the last convolutional layer as the convolution embedding vector of the reference audio data.

5. The method according to claim 3, wherein
the audio encoding is implemented by an encoder, the encoder comprising a recurrent neural network; and
the encoding the convolution embedding vector of the reference audio data to obtain the reference embedding vector of the reference audio data comprises:
updating a hidden vector of the recurrent neural network and the convolution embedding vector of the reference audio data to obtain update information about the reference audio data;
resetting the hidden vector of the recurrent neural network and the convolution embedding vector of the reference audio data to obtain reset information about the reference audio data; and
performing, based on the update information about the reference audio data and the reset information about the reference audio data, context encoding on the convolution embedding vector of the reference audio data to obtain the reference embedding vector of the reference audio data.

6. The method according to claim 1, wherein the performing acoustic feature conversion on the acoustic feature sequence, to obtain the audio data of the target text comprises:
smoothing the acoustic feature sequence to obtain frequency spectrum data corresponding to the acoustic feature sequence; and
performing Fourier transform on the frequency spectrum data corresponding to the acoustic feature sequence, to obtain the audio data which conform to the tone of the target object and correspond to the target text.

7. An electronic device, comprising:
a memory, configured to store executable instructions; and
a processor, configured to, when executing the executable instructions stored in the memory, cause the electronic device to perform an audio processing method including:
sampling multiple fragments of audio data of a target object to obtain reference audio data of the target object;
performing audio encoding on the reference audio data of the target object to obtain a reference embedding vector of the reference audio data;
performing tone-based attention processing on the reference embedding vector of the reference audio data to obtain a tone embedding vector of the target object, wherein the tone embedding vector is independent from content of the audio data;
encoding a target text to obtain a content embedding vector of the target text;
aligning the tone embedding vector of the target object and the content embedding vector of the target text to obtain an aligned vector of the target text;
decoding the aligned vector of the target text to obtain an acoustic feature sequence of the target text; and
performing acoustic feature conversion on the acoustic feature sequence, to obtain audio data of the target text.

8. The electronic device according to claim 7, wherein the performing tone-based attention processing on the reference embedding vector of the reference audio data to obtain a tone embedding vector of the target object comprises:
mapping, based on an embedding space of multiple object tones, the reference embedding vector of the reference audio data to obtain weights of the multiple object tones; and
performing, based on the weights of the multiple object tones, weighted summation on embedding vectors of the multiple object tones to obtain the tone embedding vector of the target object.

9. The electronic device according to claim 7, wherein the performing audio encoding on the reference audio data of the target object to obtain a reference embedding vector of the reference audio data comprises:
performing convolution processing on the reference audio data of the target object to obtain a convolution embedding vector of the reference audio data; and
encoding the convolution embedding vector of the reference audio data to obtain the reference embedding vector of the reference audio data.

10. The electronic device according to claim 7, wherein the performing acoustic feature conversion on the acoustic feature sequence, to obtain the audio data of the target text comprises:
smoothing the acoustic feature sequence to obtain frequency spectrum data corresponding to the acoustic feature sequence; and
performing Fourier transform on the frequency spectrum data corresponding to the acoustic feature sequence, to obtain the audio data which conform to the tone of the target object and correspond to the target text.

11. A non-transitory computer-readable storage medium storing executable instructions for, when executed by a processor of an electronic device, causing the electronic device to perform an audio processing method including:
sampling multiple fragments of audio data of a target object to obtain reference audio data of the target object;
performing audio encoding on the reference audio data of the target object to obtain a reference embedding vector of the reference audio data;
performing tone-based attention processing on the reference embedding vector of the reference audio data to obtain a tone embedding vector of the target object, wherein the tone embedding vector is independent from content of the audio data;
encoding a target text to obtain a content embedding vector of the target text;
aligning the tone embedding vector of the target object and the content embedding vector of the target text to obtain an aligned vector of the target text;
decoding the aligned vector of the target text to obtain an acoustic feature sequence of the target text; and
performing acoustic feature conversion on the acoustic feature sequence, to obtain audio data of the target text.

12. The non-transitory computer-readable storage medium according to claim 11, wherein the performing tone-based attention processing on the reference embedding vector of the reference audio data to obtain a tone embedding vector of the target object comprises:
mapping, based on an embedding space of multiple object tones, the reference embedding vector of the reference audio data to obtain weights of the multiple object tones; and performing, based on the weights of the multiple object tones, weighted summation on embedding vectors of the multiple object tones to obtain the tone embedding vector of the target object.

13. The non-transitory computer-readable storage medium according to claim 11, wherein the performing audio encoding on the reference audio data of the target object to obtain a reference embedding vector of the reference audio data comprises:
performing convolution processing on the reference audio data of the target object to obtain a convolution embedding vector of the reference audio data; and
encoding the convolution embedding vector of the reference audio data to obtain the reference embedding vector of the reference audio data.

14. The non-transitory computer-readable storage medium according to claim 11, wherein the performing acoustic feature conversion on the acoustic feature sequence, to obtain the audio data of the target text comprises:
smoothing the acoustic feature sequence to obtain frequency spectrum data corresponding to the acoustic feature sequence; and
performing Fourier transform on the frequency spectrum data corresponding to the acoustic feature sequence, to obtain the audio data which conform to the tone of the target object and correspond to the target text.

15. The electronic device according to claim 9, wherein the audio encoding is implemented by an encoder, the encoder comprising multiple cascaded convolutional layers; and
the performing convolution processing on the reference audio data of the target object to obtain a convolution embedding vector of the reference audio data comprises:
performing, by a first convolutional layer among the multiple cascaded convolutional layers, convolution processing on the reference audio data of the target object; and
outputting a convolution result of the first convolutional layer to a subsequent cascaded convolutional layer, continuing, by the subsequent cascaded convolutional layer, to perform the convolution processing and output a convolution result until a last convolutional layer outputs a convolution result, and
using the convolution result output by the last convolutional layer as the convolution embedding vector of the reference audio data.

16. The electronic device according to claim 9, wherein the audio encoding is implemented by an encoder, the encoder comprising a recurrent neural network; and
the encoding the convolution embedding vector of the reference audio data to obtain the reference embedding vector of the reference audio data comprises:
updating a hidden vector of the recurrent neural network and the convolution embedding vector of the reference audio data to obtain update information about the reference audio data;
resetting the hidden vector of the recurrent neural network and the convolution embedding vector of the reference audio data to obtain reset information about the reference audio data; and
performing, based on the update information about the reference audio data and the reset information about the reference audio data, context encoding on the convolution embedding vector of the reference audio data to obtain the reference embedding vector of the reference audio data.

17. The non-transitory computer-readable storage medium according to claim 13, wherein the audio encoding is implemented by an encoder, the encoder comprising multiple cascaded convolutional layers; and
the performing convolution processing on the reference audio data of the target object to obtain a convolution embedding vector of the reference audio data comprises:
performing, by a first convolutional layer among the multiple cascaded convolutional layers, convolution processing on the reference audio data of the target object; and
outputting a convolution result of the first convolutional layer to a subsequent cascaded convolutional layer, continuing, by the subsequent cascaded convolutional layer, to perform the convolution processing and output a convolution result until a last convolutional layer outputs a convolution result, and
using the convolution result output by the last convolutional layer as the convolution embedding vector of the reference audio data.

18. The non-transitory computer-readable storage medium according to claim 13, wherein the audio encoding is implemented by an encoder, the encoder comprising a recurrent neural network; and
the encoding the convolution embedding vector of the reference audio data to obtain the reference embedding vector of the reference audio data comprises:
updating a hidden vector of the recurrent neural network and the convolution embedding vector of the reference audio data to obtain update information about the reference audio data;
resetting the hidden vector of the recurrent neural network and the convolution embedding vector of the reference audio data to obtain reset information about the reference audio data; and
performing, based on the update information about the reference audio data and the reset information about the reference audio data, context encoding on the convolution embedding vector of the reference audio data to obtain the reference embedding vector of the reference audio data.

* * * * *